United States Patent [19]
Endo et al.

[11] Patent Number: 6,058,216
[45] Date of Patent: May 2, 2000

[54] APPARATUS FOR ENCODING IMAGE DATA

[75] Inventors: Tsutomu Endo, Amagasaki; Nobuo Hayashi, Takatsuki, both of Japan

[73] Assignee: Sumitomo Metal Industries Limited, Japan

[21] Appl. No.: 08/922,846

[22] Filed: Sep. 3, 1997

[30] Foreign Application Priority Data

Sep. 3, 1996 [JP] Japan ................................ 8-252464
Nov. 12, 1996 [JP] Japan ................................ 8-315607

[51] Int. Cl.$^7$ .................................................. G06K 9/36
[52] U.S. Cl. ............................................................ 382/247
[58] Field of Search ................................. 382/247, 244, 382/238; 341/107

[56] References Cited

U.S. PATENT DOCUMENTS

| | | | |
|---|---|---|---|
| 4,286,256 | 8/1981 | Langdon, Jr. et al. | 340/347 |
| 4,295,125 | 10/1981 | Langdon, Jr. | 340/347 |
| 4,463,342 | 7/1984 | Langdon, Jr. et al. | 340/347 |
| 4,467,317 | 8/1984 | Langdon, Jr. et al. | 340/347 |
| 4,633,490 | 12/1986 | Goertzel et al. | 375/122 |
| 4,652,856 | 3/1987 | Mohiuddin et al. | 340/347 |
| 4,870,947 | 10/1989 | Kawamoto | 126/91 |
| 4,873,577 | 10/1989 | Chamzas | 358/426 |
| 4,891,643 | 1/1990 | Mitchell et al. | 341/107 |
| 4,901,363 | 2/1990 | Toyokawa | 382/56 |
| 4,905,297 | 2/1990 | Langdon, Jr. et al. | 382/56 |
| 4,935,882 | 6/1990 | Pennebaker et al. | 364/554 |
| 4,973,961 | 11/1990 | Chamzas et al. | 341/51 |
| 4,979,049 | 12/1990 | Chamzas et al. | 358/426 |
| 4,982,292 | 1/1991 | Itoh et al. | 358/426 |
| 5,023,611 | 6/1991 | Chamzas et al. | 341/51 |
| 5,025,258 | 6/1991 | Duttweiler | 341/107 |
| 5,031,053 | 7/1991 | Chamzas et al. | 358/426 |
| 5,099,440 | 3/1992 | Pennebaker et al. | 364/554 |
| 5,736,947 | 4/1998 | Imanaka | 341/107 |
| 5,784,497 | 7/1998 | Ishizuka et al. | 382/247 |

FOREIGN PATENT DOCUMENTS 6121172  4/1994  Japan ........................... H04N 1/411

OTHER PUBLICATIONS

ISO/IEC 10918–1:1994 (E),First Edition pp. 1–182. Copyright Office Geneve,Switzerland.
ISO/IEC 11544:1993(E),First Edition, pp. 1–71. Copyright Office Geneve,Switzerland.

*Primary Examiner*—Joseph Mancuso
*Assistant Examiner*—Paul H. Schirduan
*Attorney, Agent, or Firm*—Rossi & Associates

[57] ABSTRACT

An encoding apparatus includes an interval register (250), a calculator (208, etc.), means for providing a potential shift-amount (Shift_LSZ) of the interval register for the image data in a specific condition (LPS), a shift-amount decision circuit (258), a shift-amount register (259), and a shifter (251). The interval register stores plural bits of interval data to be used for encoding the image data. The calculator updates the interval data in the interval register. The shift-amount decision circuit generates an actual shift-amount of the interval register, in accordance with the potential shift-amount and the output of the calculator. The shift-amount register stores the actual shift-amount, supplied from the shift-amount decision circuit. The shifter shifts the interval data in the interval register a plurality of bits at one time, in accordance with the actual shift-amount stored in the shift-amount register.

17 Claims, 27 Drawing Sheets

FIG. 2

| CX (CONTEXT) | | | | | | | | | | MPS | ST |
|---|---|---|---|---|---|---|---|---|---|---|---|
| R9 | R8 | R7 | R6 | R5 | R4 | R3 | R2 | R1 | R0 | | |
| 0 | 0 | 0 | 0 | 0 | 0 | 0 | 0 | 0 | 0 | 0 | 12 |
| 0 | 0 | 0 | 0 | 0 | 0 | 0 | 0 | 0 | 1 | 1 | 0 |
| 0 | 0 | 0 | 0 | 0 | 0 | 0 | 0 | 1 | 0 | 0 | 1 |
| 1 | 0 | 1 | 0 | 1 | 0 | 0 | 0 | 1 | 1 | 1 | 3 |
| 1 | 1 | 1 | 1 | 1 | 1 | 1 | 1 | 1 | 1 | 1 | 8 |

| ST | LSZ | NLPS | NMPS | SWITCH | ST | LSZ | NLPS | NMPS | SWITCH |
|---|---|---|---|---|---|---|---|---|---|
| 0 | 0x5a1d | 1 | 1 | 1 | 57 | 0x01a4 | 55 | 58 | 0 |
| 1 | 0x2586 | 14 | 2 | 0 | 58 | 0x0160 | 56 | 59 | 0 |
| 2 | 0x1114 | 16 | 3 | 0 | 59 | 0x0125 | 57 | 60 | 0 |
| 3 | 0x080b | 18 | 4 | 0 | 60 | 0x00f6 | 58 | 61 | 0 |
| 4 | 0x03d8 | 20 | 5 | 0 | 61 | 0x00cb | 59 | 62 | 0 |
| 5 | 0x01da | 23 | 6 | 0 | 62 | 0x00ab | 61 | 63 | 0 |
| 6 | 0x00e5 | 25 | 7 | 0 | 63 | 0x008f | 61 | 32 | 0 |
| 7 | 0x006f | 28 | 8 | 0 | 64 | 0x5b12 | 65 | 65 | 1 |
| 8 | 0x0036 | 30 | 9 | 0 | 65 | 0x4d04 | 80 | 66 | 0 |
| 9 | 0x001a | 33 | 10 | 0 | 66 | 0x412c | 81 | 67 | 0 |
| 10 | 0x000d | 35 | 11 | 0 | 67 | 0x37d8 | 82 | 68 | 0 |
| 11 | 0x0006 | 9 | 12 | 0 | 68 | 0x2fe8 | 83 | 69 | 0 |
| 12 | 0x0003 | 10 | 13 | 0 | 69 | 0x293c | 84 | 70 | 0 |
| 13 | 0x0001 | 12 | 14 | 0 | 70 | 0x2379 | 86 | 71 | 0 |
| 14 | 0x5a7f | 15 | 15 | 1 | 71 | 0x1edf | 87 | 72 | 0 |
| 15 | 0x3f25 | 36 | 16 | 0 | 72 | 0x1aa9 | 87 | 73 | 0 |
| 16 | 0x2cf2 | 38 | 17 | 0 | 73 | 0x174e | 72 | 74 | 0 |
| 17 | 0x207c | 39 | 18 | 0 | 74 | 0x1424 | 72 | 75 | 0 |
| 18 | 0x17b9 | 40 | 19 | 0 | 75 | 0x119c | 74 | 76 | 0 |
| 19 | 0x1182 | 42 | 20 | 0 | 76 | 0x0f6b | 74 | 77 | 0 |
| 20 | 0x0cef | 43 | 21 | 0 | 77 | 0x0d51 | 75 | 78 | 0 |
| 21 | 0x09a1 | 45 | 22 | 0 | 78 | 0x0bb6 | 77 | 79 | 0 |
| 22 | 0x072f | 46 | 23 | 0 | 79 | 0x0a40 | 77 | 48 | 0 |
| 23 | 0x055c | 48 | 24 | 0 | 80 | 0x5832 | 80 | 81 | 1 |
| 24 | 0x0406 | 49 | 25 | 0 | 81 | 0x4d1c | 88 | 82 | 0 |
| 25 | 0x0303 | 51 | 26 | 0 | 82 | 0x438e | 89 | 83 | 0 |
| 26 | 0x0240 | 52 | 27 | 0 | 83 | 0x3bdd | 90 | 84 | 0 |
| 27 | 0x01b1 | 54 | 28 | 0 | 84 | 0x34ee | 91 | 85 | 0 |
| 28 | 0x0144 | 56 | 29 | 0 | 85 | 0x2eae | 92 | 86 | 0 |
| 29 | 0x00f5 | 57 | 30 | 0 | 86 | 0x299a | 93 | 87 | 0 |
| 30 | 0x00b7 | 59 | 31 | 0 | 87 | 0x2516 | 86 | 71 | 0 |
| 31 | 0x008a | 60 | 32 | 0 | 88 | 0x5570 | 88 | 89 | 1 |
| 32 | 0x0068 | 62 | 33 | 0 | 89 | 0x4ca9 | 95 | 90 | 0 |
| 33 | 0x004e | 63 | 34 | 0 | 90 | 0x44d9 | 96 | 91 | 0 |
| 34 | 0x003b | 32 | 35 | 0 | 91 | 0x3e22 | 97 | 92 | 0 |
| 35 | 0x002c | 33 | 36 | 0 | 92 | 0x3824 | 99 | 93 | 0 |
| 36 | 0x5ae1 | 37 | 37 | 1 | 93 | 0x32b4 | 99 | 94 | 0 |
| 37 | 0x484c | 64 | 38 | 0 | 94 | 0x2e17 | 93 | 86 | 0 |
| 38 | 0x3a0d | 65 | 39 | 0 | 95 | 0x56a8 | 95 | 96 | 1 |
| 39 | 0x2ef1 | 67 | 40 | 0 | 96 | 0x4f46 | 101 | 97 | 0 |
| 40 | 0x261f | 68 | 41 | 0 | 97 | 0x47e5 | 102 | 98 | 0 |
| 41 | 0x1f33 | 69 | 42 | 0 | 98 | 0x41cf | 103 | 99 | 0 |
| 42 | 0x19a8 | 70 | 43 | 0 | 99 | 0x3c3d | 104 | 100 | 0 |
| 43 | 0x1518 | 72 | 44 | 0 | 100 | 0x375e | 99 | 93 | 0 |
| 44 | 0x1177 | 73 | 45 | 0 | 101 | 0x5231 | 105 | 102 | 0 |
| 45 | 0x0e74 | 74 | 46 | 0 | 102 | 0x4c0f | 106 | 103 | 0 |
| 46 | 0x0bfb | 75 | 47 | 0 | 103 | 0x4639 | 107 | 104 | 0 |
| 47 | 0x09f8 | 77 | 48 | 0 | 104 | 0x415e | 103 | 99 | 0 |
| 48 | 0x0861 | 78 | 49 | 0 | 105 | 0x5627 | 105 | 106 | 1 |
| 49 | 0x0706 | 79 | 50 | 0 | 106 | 0x50e7 | 108 | 107 | 0 |
| 50 | 0x05cd | 48 | 51 | 0 | 107 | 0x4b85 | 109 | 103 | 0 |
| 51 | 0x04de | 50 | 52 | 0 | 108 | 0x5597 | 110 | 109 | 0 |
| 52 | 0x040f | 50 | 53 | 0 | 109 | 0x504f | 111 | 107 | 0 |
| 53 | 0x0363 | 51 | 54 | 0 | 110 | 0x5a10 | 110 | 111 | 1 |
| 54 | 0x02d4 | 52 | 55 | 0 | 111 | 0x5522 | 112 | 109 | 0 |
| 55 | 0x025c | 53 | 56 | 0 | 112 | 0x59eb | 112 | 111 | 1 |
| 56 | 0x01f8 | 54 | 57 | 0 | | | | | |

FIG. 4

|  | MSB | | | LSB |
|---|---|---|---|---|
| C register | 0000cbbb, | bbbbbsss, | xxxxxxxx, | xxxxxxxx |
| A register | 00000000, | 0000000a, | aaaaaaaa, | aaaaaaaa |

FIG. 16

| RANGE OF LSZ | SHIFT |
|---|---|
| 0001H | 15 |
| 0002H−0003H | 14 |
| 0004H−0007H | 13 |
| 0008H−000FH | 12 |
| 0010H−001FH | 11 |
| 0020H−003FH | 10 |
| 0040H−007FH | 9 |
| 0080H−00FFH | 8 |
| 0100H−01FFH | 7 |
| 0200H−03FFH | 6 |
| 0400H−07FFH | 5 |
| 0800H−0FFFH | 4 |
| 1000H−1FFFH | 3 |
| 2000H−3FFFH | 2 |
| 4000H−7FFFH | 1 |

| ST | LSZ | NLPS | NMPS | SWITCH | Shift_LSZ | ST | LSZ | NLPS | NMPS | SWITCH | Shift_LSZ |
|---|---|---|---|---|---|---|---|---|---|---|---|
| 0 | 0x5a1d | 1 | 1 | 1 | 1 | 57 | 0x01a4 | 55 | 58 | 0 | 7 |
| 1 | 0x2586 | 14 | 2 | 0 | 2 | 58 | 0x0160 | 56 | 59 | 0 | 7 |
| 2 | 0x1114 | 16 | 3 | 0 | 3 | 59 | 0x0125 | 57 | 60 | 0 | 7 |
| 3 | 0x080b | 18 | 4 | 0 | 4 | 60 | 0x00f6 | 58 | 61 | 0 | 8 |
| 4 | 0x03d8 | 20 | 5 | 0 | 6 | 61 | 0x00cb | 59 | 62 | 0 | 8 |
| 5 | 0x01da | 23 | 6 | 0 | 7 | 62 | 0x00ab | 61 | 63 | 0 | 8 |
| 6 | 0x00e5 | 25 | 7 | 0 | 8 | 63 | 0x008f | 61 | 32 | 0 | 8 |
| 7 | 0x006f | 28 | 8 | 0 | 9 | 64 | 0x5b12 | 65 | 65 | 1 | 1 |
| 8 | 0x0036 | 30 | 9 | 0 | 10 | 65 | 0x4d04 | 80 | 66 | 0 | 1 |
| 9 | 0x001a | 33 | 10 | 0 | 11 | 66 | 0x412c | 81 | 67 | 0 | 1 |
| 10 | 0x000d | 35 | 11 | 0 | 12 | 67 | 0x37d8 | 82 | 68 | 0 | 2 |
| 11 | 0x0006 | 9 | 12 | 0 | 13 | 68 | 0x2fe8 | 83 | 69 | 0 | 2 |
| 12 | 0x0003 | 10 | 13 | 0 | 14 | 69 | 0x293c | 84 | 70 | 0 | 2 |
| 13 | 0x0001 | 12 | 14 | 0 | 15 | 70 | 0x2379 | 86 | 71 | 0 | 2 |
| 14 | 0x5a7f | 15 | 15 | 1 | 1 | 71 | 0x1edf | 87 | 72 | 0 | 3 |
| 15 | 0x3f25 | 36 | 16 | 0 | 2 | 72 | 0x1aa9 | 87 | 73 | 0 | 3 |
| 16 | 0x2cf2 | 38 | 17 | 0 | 2 | 73 | 0x174e | 72 | 74 | 0 | 3 |
| 17 | 0x207c | 39 | 18 | 0 | 2 | 74 | 0x1424 | 72 | 75 | 0 | 3 |
| 18 | 0x17b9 | 40 | 19 | 0 | 3 | 75 | 0x119c | 74 | 76 | 0 | 3 |
| 19 | 0x1182 | 42 | 20 | 0 | 3 | 76 | 0x0f6b | 74 | 77 | 0 | 4 |
| 20 | 0x0cef | 43 | 21 | 0 | 4 | 77 | 0x0d51 | 75 | 78 | 0 | 4 |
| 21 | 0x09a1 | 45 | 22 | 0 | 4 | 78 | 0x0bb6 | 77 | 79 | 0 | 4 |
| 22 | 0x072f | 46 | 23 | 0 | 5 | 79 | 0x0a40 | 77 | 48 | 0 | 4 |
| 23 | 0x055c | 48 | 24 | 0 | 5 | 80 | 0x5832 | 80 | 81 | 1 | 1 |
| 24 | 0x0406 | 49 | 25 | 0 | 5 | 81 | 0x4d1c | 88 | 82 | 0 | 1 |
| 25 | 0x0303 | 51 | 26 | 0 | 6 | 82 | 0x438e | 89 | 83 | 0 | 1 |
| 26 | 0x0240 | 52 | 27 | 0 | 6 | 83 | 0x3bdd | 90 | 84 | 0 | 2 |
| 27 | 0x01b1 | 54 | 28 | 0 | 7 | 84 | 0x34ee | 91 | 85 | 0 | 2 |
| 28 | 0x0144 | 56 | 29 | 0 | 7 | 85 | 0x2eae | 92 | 86 | 0 | 2 |
| 29 | 0x00f5 | 57 | 30 | 0 | 8 | 86 | 0x299a | 93 | 87 | 0 | 2 |
| 30 | 0x00b7 | 59 | 31 | 0 | 8 | 87 | 0x2516 | 86 | 71 | 0 | 2 |
| 31 | 0x008a | 60 | 32 | 0 | 8 | 88 | 0x5570 | 88 | 89 | 1 | 1 |
| 32 | 0x0068 | 62 | 33 | 0 | 9 | 89 | 0x4ca9 | 95 | 90 | 0 | 1 |
| 33 | 0x004e | 63 | 34 | 0 | 9 | 90 | 0x44d9 | 96 | 91 | 0 | 1 |
| 34 | 0x003b | 32 | 35 | 0 | 10 | 91 | 0x3e22 | 97 | 92 | 0 | 2 |
| 35 | 0x002c | 33 | 36 | 0 | 10 | 92 | 0x3824 | 99 | 93 | 0 | 2 |
| 36 | 0x5ae1 | 37 | 37 | 1 | 1 | 93 | 0x32b4 | 99 | 94 | 0 | 2 |
| 37 | 0x484c | 64 | 38 | 0 | 1 | 94 | 0x2e17 | 93 | 86 | 0 | 2 |
| 38 | 0x3a0d | 65 | 39 | 0 | 2 | 95 | 0x56a8 | 95 | 96 | 1 | 1 |
| 39 | 0x2ef1 | 67 | 40 | 0 | 2 | 96 | 0x4f46 | 101 | 97 | 0 | 1 |
| 40 | 0x261f | 68 | 41 | 0 | 2 | 97 | 0x47e5 | 102 | 98 | 0 | 1 |
| 41 | 0x1f33 | 69 | 42 | 0 | 3 | 98 | 0x41cf | 103 | 99 | 0 | 1 |
| 42 | 0x19a8 | 70 | 43 | 0 | 3 | 99 | 0x3c3d | 104 | 100 | 0 | 2 |
| 43 | 0x1518 | 72 | 44 | 0 | 3 | 100 | 0x375e | 99 | 93 | 0 | 2 |
| 44 | 0x1177 | 73 | 45 | 0 | 3 | 101 | 0x5231 | 105 | 102 | 0 | 1 |
| 45 | 0x0e74 | 74 | 46 | 0 | 4 | 102 | 0x4c0f | 106 | 103 | 0 | 1 |
| 46 | 0x0bfb | 75 | 47 | 0 | 4 | 103 | 0x4639 | 107 | 104 | 0 | 1 |
| 47 | 0x09f8 | 77 | 48 | 0 | 4 | 104 | 0x415e | 103 | 99 | 0 | 1 |
| 48 | 0x0861 | 78 | 49 | 0 | 4 | 105 | 0x5627 | 105 | 106 | 1 | 1 |
| 49 | 0x0706 | 79 | 50 | 0 | 5 | 106 | 0x50e7 | 108 | 107 | 0 | 1 |
| 50 | 0x05cd | 48 | 51 | 0 | 5 | 107 | 0x4b85 | 109 | 103 | 0 | 1 |
| 51 | 0x04de | 50 | 52 | 0 | 5 | 108 | 0x5597 | 110 | 109 | 0 | 1 |
| 52 | 0x040f | 50 | 53 | 0 | 5 | 109 | 0x504f | 111 | 107 | 0 | 1 |
| 53 | 0x0363 | 51 | 54 | 0 | 6 | 110 | 0x5a10 | 110 | 111 | 1 | 1 |
| 54 | 0x02d4 | 52 | 55 | 0 | 6 | 111 | 0x5522 | 112 | 109 | 0 | 1 |
| 55 | 0x025c | 53 | 56 | 0 | 6 | 112 | 0x59eb | 112 | 111 | 1 | 1 |
| 56 | 0x01f8 | 54 | 57 | 0 | 7 | | | | | | |

FIG. 21

| CT \ Shift | 1 | 2 | 3 | 4 | 5 | 6 | 7 | 8 | 9 | 10 | 11 |
|---|---|---|---|---|---|---|---|---|---|---|---|
| 0 | 1 | 2 | 3 | 4 | 5 | 6 | 7 | 8 | 9 | 10 | 11 |
| 1 | 8 | 1 | 2 | 3 | 4 | 5 | 6 | 7 | 8 | 9 | 10 |
| 2 | 7 | 8 | 1 | 2 | 3 | 4 | 5 | 6 | 7 | 8 | 9 |
| 3 | 6 | 7 | 8 | 1 | 2 | 3 | 4 | 5 | 6 | 7 | 8 |
| 4 | 5 | 6 | 7 | 8 | 1 | 2 | 3 | 4 | 5 | 6 | 7 |
| 5 | 4 | 5 | 6 | 7 | 8 | 1 | 2 | 3 | 4 | 5 | 6 |
| 6 | 3 | 4 | 5 | 6 | 7 | 8 | 1 | 2 | 3 | 4 | 5 |
| 7 | 2 | 3 | 4 | 5 | 6 | 7 | 8 | 1 | 2 | 3 | 4 |
| 8 | 1 | 2 | 3 | 4 | 5 | 6 | 7 | 8 | 1 | 2 | 3 |
| 9 | 8 | 1 | 2 | 3 | 4 | 5 | 6 | 7 | 8 | 1 | 2 |
| 10 | 7 | 8 | 1 | 2 | 3 | 4 | 5 | 6 | 7 | 8 | 1 |
| 11 | 6 | 7 | 8 | 1 | 2 | 3 | 4 | 5 | 6 | 7 | 8 |
| 12 | 5 | 6 | 7 | 8 | 1 | 2 | 3 | 4 | 5 | 6 | 7 |
| 13 | 4 | 5 | 6 | 7 | 8 | 1 | 2 | 3 | 4 | 5 | 6 |
| 14 | 3 | 4 | 5 | 6 | 7 | 8 | 1 | 2 | 3 | 4 | 5 |
| 15 | 2 | 3 | 4 | 5 | 6 | 7 | 8 | 1 | 2 | 3 | 4 |

FIG. 29

| INPUT | | OUTPUT | |
|---|---|---|---|
| LSZ[14:0](Binary) | LSZ[14:0](Hexadecimal) | shift_LSZ[3:0](Binary) | SHIFT (Decimal) |
| 000_0000_0000_0001 | 0001H | 1111 | 15 |
| 000_0000_0000_001x | 0002H - 0003H | 1110 | 14 |
| 000_0000_0000_01xx | 0004H - 0007H | 1101 | 13 |
| 000_0000_0000_1xxx | 0008H - 000FH | 1100 | 12 |
| 000_0000_0001_xxxx | 0010H - 001FH | 1011 | 11 |
| 000_0000_001x_xxxx | 0020H - 003FH | 1010 | 10 |
| 000_0000_01xx_xxxx | 0040H - 007FH | 1001 | 9 |
| 000_0000_1xxx_xxxx | 0080H - 00FFH | 1000 | 8 |
| 000_0001_xxxx_xxxx | 0100H - 01FFH | 0111 | 7 |
| 000_001x_xxxx_xxxx | 0200H - 03FFH | 0110 | 6 |
| 000_01xx_xxxx_xxxx | 0400H - 07FFH | 0101 | 5 |
| 000_1xxx_xxxx_xxxx | 0800H - 0FFFH | 0100 | 4 |
| 001_xxxx_xxxx_xxxx | 1000H - 1FFFH | 0011 | 3 |
| 01x_xxxx_xxxx_xxxx | 2000H - 3FFFH | 0010 | 2 |
| 1xx_xxxx_xxxx_xxxx | 4000H - 7FFFH | 0001 | 1 |

APPARATUS FOR ENCODING IMAGE DATA

CROSS REFERENCE TO RELATED APPLICATION

This application claims the priorities of Applications No. H08-252464, filed Sep. 3, 1996 in Japan and No. H08-315607, filed Nov. 12, 1996 in Japan. The subject matter of each application is incorporated herein by reference.

TECHNICAL FIELD OF THE INVENTION

The present invention relates to an apparatus for encoding/decoding image data, and more particularly to an encoding/decoding apparatus using arithmetic encoding technique.

BACKGROUND OF INVENTION

For electrically processing an image related data, the data is encoded to generate a code to be recognized by a machine, such as a computer. For transmitting an image data via telephone line, radio waves, or the like, the image data is generally compressed to reduce the amount of data to be transmitted.

There has been proposed an image data encoding apparatus which uses the adaptive arithmetic encoding technique. In arithmetic encoding, a probability real-number line is divided into two intervals at a rate corresponding to the probability (1 or 0) of a symbol sequence to be encoded The binary decimal value indicating a boundary point (lower bound) of the divided interval becomes an output code of the apparatus. An arithmetic encoding technique according to "ISO/IEC 1544" is applied especially to a transmission/receiving system, which processes a binary (bi-level) image to be processed by an apparatus such as a facsimile machine.

According to conventional apparatuses, there is a disadvantage in that a normalization (re-normalization) process can not be performed in a stable period of time; and therefore, it becomes difficult to realize a real-time encoding porcess.

For solving such a problem, an encoding apparatus has been proposed in Japanese Laying Open Kokai No. H6-121172, which includes a monitor means for monitoring the contents of an interval register (A-register), and a shifter means for shifting the data in the interval register a plurality bits at one time, in accordance with the monitored information. With this kind of apparatus, the normalization (re-normalization) process can be performed in one clock cycle (stable period of time), however another problems arise. Namely, it is difficult to improve process speed. In addition, it becomes difficult to realize a real-time encoding process if a symbol (image data) to be encoded is inputted for every clock cycle.

OBJECTS OF THE INVENTION

Accordingly, an object of the invention is to provide an encoding (decoding) apparatus which realizes high speed processing of an image data Another object of the invention is to provide an encoding apparatus which realizes a real-time encoding.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

First Aspect of the Invention

According to a first aspect of the invention, an apparatus for encoding an image data includes an interval register (250), a calculator (208, etc.), means for providing a potential shift-amount (Shift_LSZ) of the interval register for the image data in a specific condition (LPS), a shift-amount decision circuit (258), a shift-amount register (259), and a shifter (251). The interval register stores plural bits of interval data to be used for encoding the image data. The calculator updates the interval data in the interval register. The shift-amount decision circuit 258 generates an actual shift-amount of the interval register, 250 in accordance with the potential shift-amount Shift_LSZ and the output of the calculator 208. The shift-amount register 259 stores the actual shift-amount, supplied from the shift-amount decision circuit 258. The shifter shifts the interval data in the interval register a plurality of bits at one time, in accordance with the actual shift-amount stored in the shift-amount register.

In such an apparatus, the potential shift-amount providing means may be a memory (210) which stores the potential shift-amount of the interval register for the image data in the specific condition. Otherwise, the potential shift-amount providing means may be another calculator (274) which calculates in advance the potential shift-amount of the interval register for the image data in the specific condition.

Second Aspect of the Invention

According to a second aspect of the invention, a more practical apparatus for encoding an image data includes an interval register (250), a prediction circuit (208), a first calculator (252), a first comparator (256), a second comparator (254, 255), a memory (210), a shift-amount decision circuit (258), a first shift-amount register (259) and a first shifter (251). The interval register stores plural bits of interval data to be used for encoding the image data. The prediction circuit compares the image data to a predetermined prediction value (MPS) thereof. The first calculator (252) calculates, on the basis of the comparison result of the prediction circuit, a first interval (A-LSZ) on the probability real-number line to be assigned to the image data that is identical to its prediction value (MPS). The first comparator compares the first interval (A-LSZ) to a predetermined threshold value (0x8000). The second comparator compares the first interval (A-LSZ) to a second interval (LSZ) assigned to an image data that is not identical to its prediction value. The memory stores a potential shift-amount (Shift_LSZ) of the interval register, which is used for the image data that is not identical to its prediction value. The shift-amount decision circuit generates an actual shift-amount of the interval register, in accordance with the potential shift-amount and the outputs of the prediction circuit, the first calculator, the first comparator and the second comparator. The first shift-amount register stores the actual shift-amount, supplied from the shift-amount decision circuit. The first shifter shifts the interval data in the interval register a plurality of bits at one time, in accordance with the actual shift-amount, stored in the first shift-amount register.

In the apparatus, the output of the first shifter (251) may be supplied to the first calculator (252). Both normalization process and interval calculation (A-LSZ) to the interval register (250) can be performed in one dock cycle, namely, these processes can be performed in a constant period of time. Therefore, the encoding process can be performed in synchronization with data input.

The apparatus may further includes a code register (263) which stores a data indicating the boundary point on the probability real-number line; a calculation-result register (260) which stores the output of the first calculator (252); a second calculator (265) which calculates an update value of the code register (263) on the basis of the output of the calculation-result register; a second shift-amount register (261) which stores the actual shift-amount supplied to the first shifter (251); and a second shifter (264) which shifts the data in the code register a plurality of bits at one time, in accordance with the actual shift-amount stored in the second shift-amount register (261). In this case, the output of the code register (263) becomes the code output of the image data. Interval calculation (A-LSZ) of the interval register (250) and boundary-point calculation (C+(A-LSZ)) to the code register (263) can be performed in the different clocks. As a result, the dock cycle (dock frequency) can be shortened, and therefore, the encoding process speed can be faster.

The apparatus may further includes a converter (269) which performs a predetermined conversion process to a part of the code output when the code output is made. The output of the converter (269) is supplied to the second calculator (265). Both normalization process and boundary-point calculation (C+(A-LSZ)) to the code register (263) can be performed in one clock cycle, namely, these processes for the code register (263) can be performed in a fixed period of time. Therefore, a real-time encoding can be realized.

In the apparatus, the second comparator (255, 254) may include a shift operation circuit (254) which shifts the second interval (LSZ) on the probability real-number line one bit to double the second interval (LSZ); and a comparing circuit (255) which compares the output of the shift operation circuit (254) to the interval data from the first shifter (251). According to this modification, because the data from the first shifter (251) and the output data of the shift operation circuit (254) are compared to each other, a generally-needed subtractor which calculate the first interval (A-LSZ) can be omitted As a result, the time for comparing the first and second intervals (A-LSZ) and (LSZ) can be shortened to almost half, and therefore, the encoding speed becomes faster.

Third Aspect of the Invention

A decoding apparatus, according to a third aspect of the invention, is designed to decode the code data supplied from the encoding apparatus according to the second aspect of the invention. The apparatus includes an interval register, a calculator, means for providing a potential shift-amount of the interval register for the image data that was in a specific condition, a shift-amount decision circuit, a shift-amount register, and a shifter. The interval register stores plural bits of interval data to be used for decoding the code data. The calculator updates the interval data in the interval register. The shift-amount decision circuit generates an actual shift-amount of the interval register, in accordance with the potential shift-amount and the output of the calculator. The shift-amount register stores the actual shift-amount, supplied from the shift-amount decision circuit. The shifter shifts the interval data in the interval register a plurality of bits at one time, in accordance with the actual shift-amount stored in the shift-amount register.

Fourth Aspect of the Invention

An apparatus according to a fourth aspect of the invention is composed of the encoding apparatus according to the second aspect of the invention, and the decoding apparatus according to the third aspect of the invention.

Fifth Aspect of the Invention

An encoding apparatus according to a fifth aspect of the invention is dose to the apparatus of the second aspect of the invention. That is, the apparatus includes, instead of the memory (210), another calculator (274) which calculates the potential shift-amount of the interval register, which is used for the image data that is not identical to its prediction value. The other elements of the fifth aspect are corresponding to those in the second aspect of the invention.

Sixth Aspect of the Invention

A decoding apparatus according to a sixth aspect of the invention is close to the apparatus of the third aspect of the invention. That is, the apparatus includes, instead of the memory, another calculator which calculates the potential shift-amount of the interval register, which is used for the image data that was not identical to its prediction value. The other elements of the sixth aspect are corresponding to those in the third aspect of the invention.

Seventh Aspect of the Invention

An apparatus according to a seventh aspect of the invention is composed of the encoding apparatus according to the fifth aspect of the invention, and the decoding apparatus according to the sixth aspect of the invention.

BRIEF DESCRIPTION OF THE DRAWINGS

FIG. 2 is a table showing the contents of a state number/MPS memory used in the encoding apparatus, shown in FIG. 1.

FIG. 3 is a table showing the contents of a probability estimation table used in the encoding apparatus, shown in FIG. 1.

FIG. 4 is an explanatory diagram showing the architecture of registers used in the encoding apparatus, shown in FIG. 1.

FIG. 16 is a table showing the relation between interval widths LSZ of less probable symbol LPS and shift-amount of interval register/code register in normalization process.

FIG. 18 is a table showing the contents of a probability estimation table used in the encoding apparatus, shown in FIG. 17.

FIG. 21 is a table used for describing the operation of the embodiment.

FIG. 29 is a truth value table showing the relation between the output and input of the priority encoder, shown in FIG. 28.

DETAILED DISCLOSURE OF THE INVENTION

Figure 1:
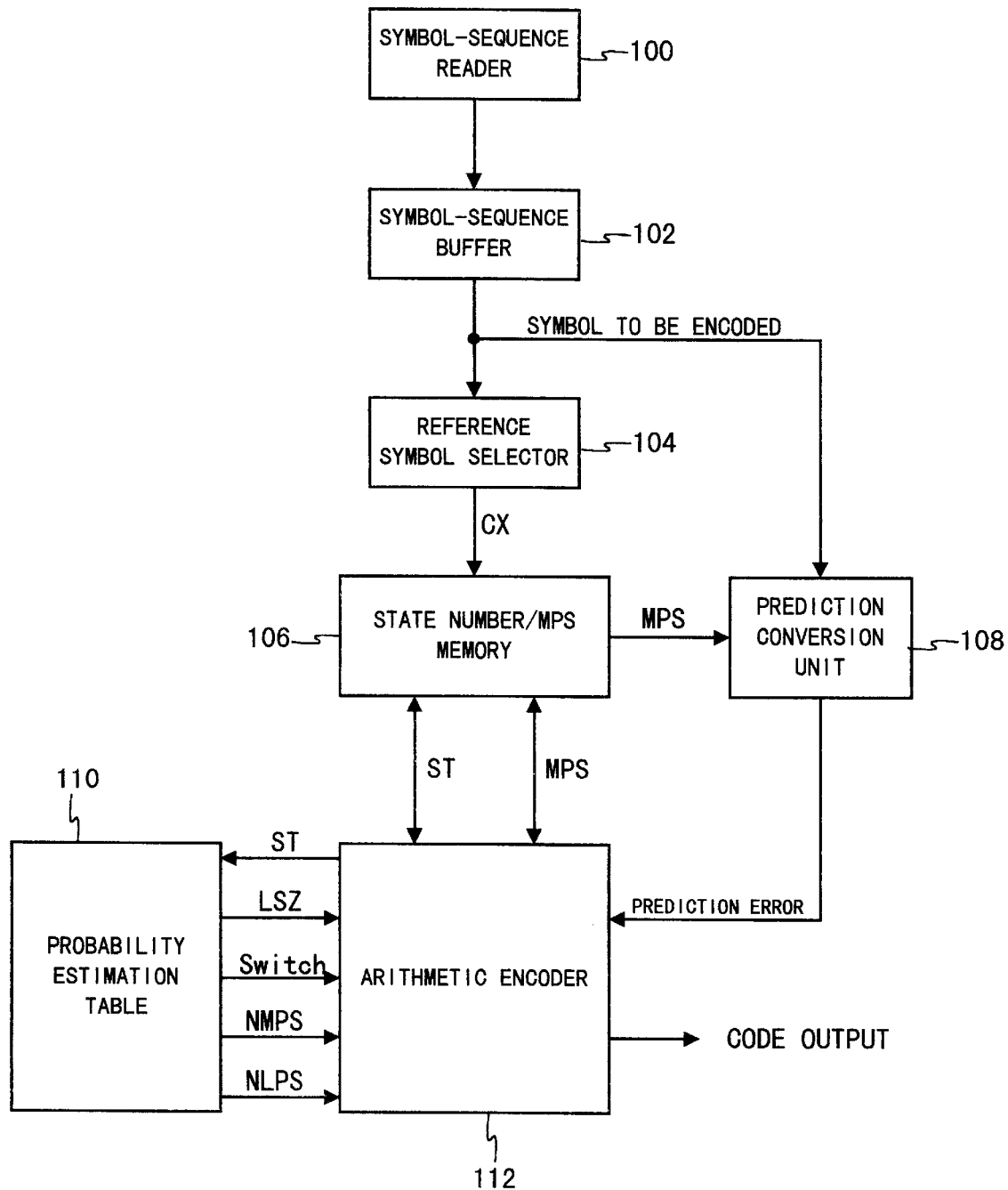
FIG. 1 is a block diagram showing a conventional encoding apparatus.

For better understanding of the invention, background technology is first described. FIG. 1 shows a conventional image data encoding apparatus, which uses adaptive arithmetic encoding technique. The image encoding apparatus includes a symbol sequence reader 100 which reads an input image data as a binary symbol sequence; a symbol sequence buffer 102 which stores the binary symbol sequence, read by the symbol sequence reader 100; and a reference symbol selector 104. The reference symbol selector 104 selects a symbol pattern from the binary symbol sequence to compress the binary symbol sequence stored in the symbol sequence buffer 102. The selected symbol pattern is mostly correlated to the current symbol to be encoded. The symbol pattern is hereinafter called a "template".

The encoding apparatus further includes a state number/MPS memory 106 which stores data shown in FIG. 2, and a prediction conversion unit 108. "MPS" is an abbreviation of more probable symbol which is a prediction value of the current symbol. The prediction conversion unit 108 finds whether or not the current symbol is identical to its more probable symbol MPS stored in the state number/MPS memory 106, in accordance with the contents of a context data CX composed of reference symbols selected by the reference symbol selector 104.

In FIG. 1, a reference number 110 represents a probability estimation table which stores, for each state number ST, a probability interval (LSZ) of a less probable symbol LPS and transition information of the state number ST. "LPS" represents the opposite value to the more probable symbol MPS for the current symbol. The less probable symbol LPS is determined for each state number in advance. FIG. 3 shows the contents of the probability estimation table 110.

A reference number 112 represents an arithmetic encoder which arithmetically encodes symbols in accordance with an output signal "Prediction Error" of the prediction conversion unit 108, the state number ST and the more probable symbol MPS, read from the state number/MPS memory 106, and the probability interval LSZ of the less probable symbol LPS and the transition state information read from the probability estimation table 110.

For performing binary arithmetic encoding, the encoding apparatus is first initialized as a whole. Namely, all the state numbers ST and all the MPS values stored in the state number/MPS memory 106 are set to zero for all the contexts CX.

Next, the width of the probability interval of the more probable symbol MPS, which is indicated by an interval register shown in FIG. 4, is set to 10000 Hex. The lower bound (boundary point) of the MPS interval "A" on the real-number line, which is indicated by a code register shown in FIG. 4, is set to zero. A counter CT, which counts the number of shifting operations for code output (byte-out), is set to 11. In accordance with the above-mentioned template, the reference symbol selector 104 loads both the current symbol and the context from the binary symbol sequence, stored in the symbol sequence buffer 102.

Figure 6:
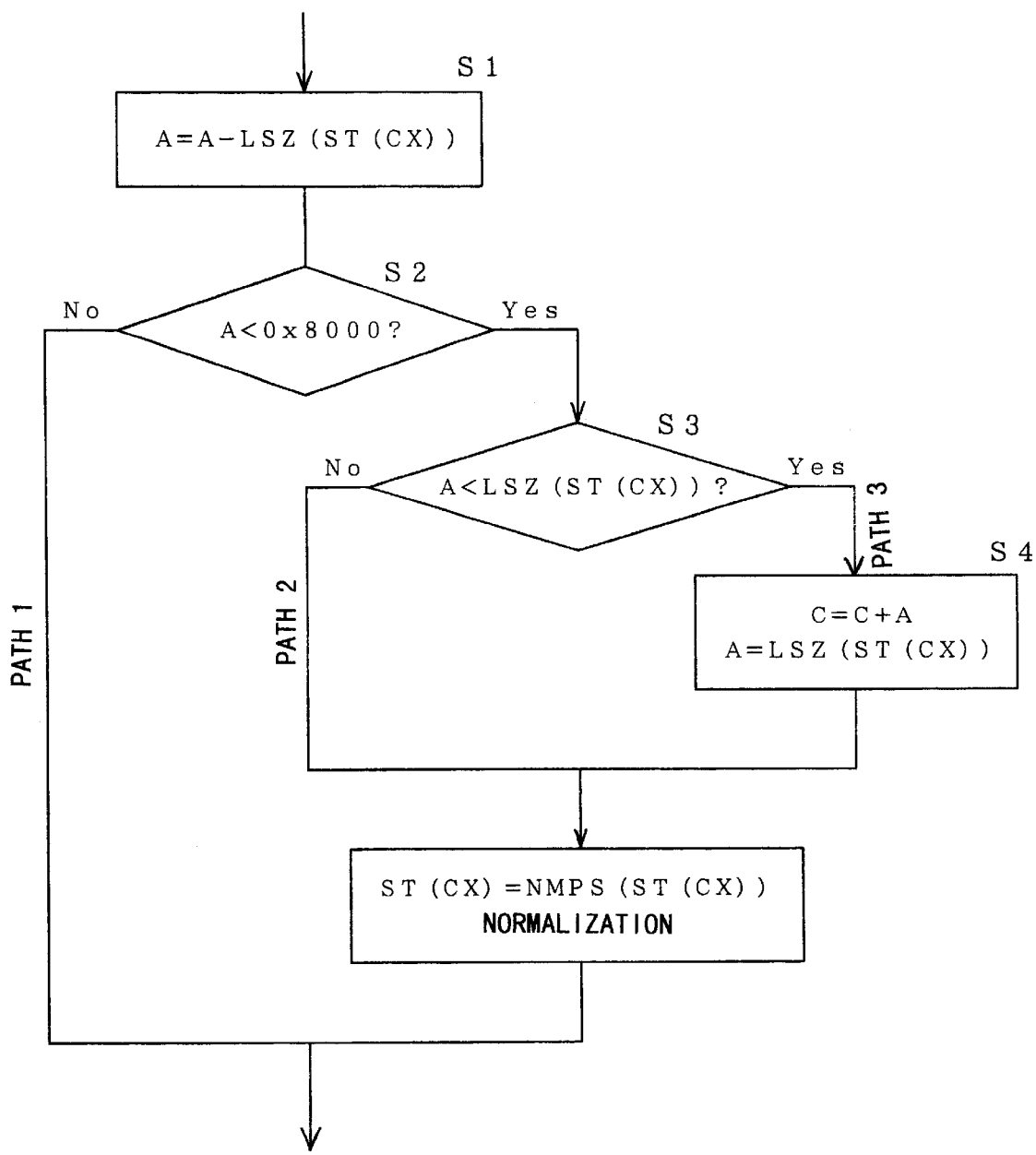
Figure 7:
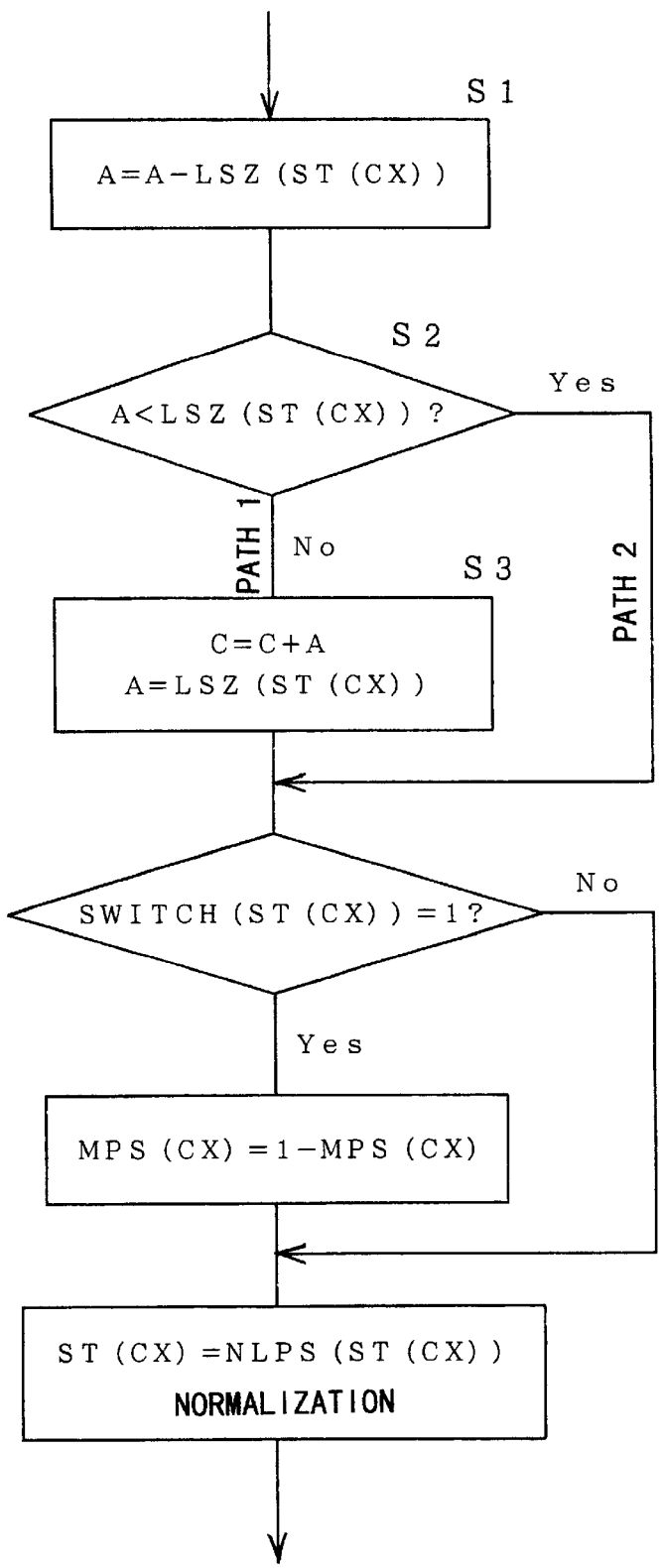

Next, the binary arithmetic encoding operation starts. In accordance with a flow chart shown in FIG. 5, the prediction conversion unit 108 first compares the current symbol to the MPS value MPS(CX) corresponding to the current context data CX, stored in the state number/MPS memory 106. If the current symbol is identical to the MPS (CX), it can be said that the symbol is MPS, and the processing shown in FIG. 6 is performed. If the current symbol is different from the MPS (CX), it can be said that the symbol is LPS, and the processing shown in FIG. 7 is performed.

Figure 8:
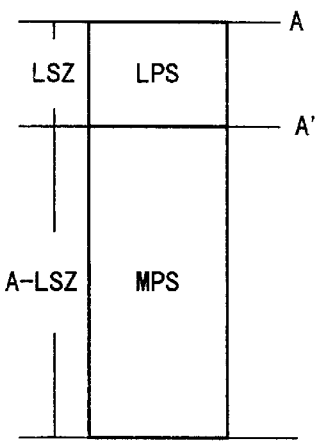
FIGS. 8 to 13 are conceptual views showing the arithmetic encoding operations.

As shown in FIG. 6, when the current symbol is MPS, the arithmetic encoder 112 calculates an interval width for the more probable symbol MPS as "A-LSZ(ST(CX))", where the current status of the context data CX is ST(CX) and an interval width given to the less probable symbol LPS is "LSZ." This calculation can be understood easily from FIG. 8. A probability interval width "A", corresponding to the probability of already-encoded symbol sequence, is divided at a ratio corresponding to the more probable symbol MPS and less probable symbol LPS for the current symbol. If the estimated probability of the more probable symbol MPS is larger than that of the less probable symbol LPS, the interval of the more probable symbol MPS is given to the current symbol, as shown in FIG. 8.

In FIG. 8, a probability interval width, which is to be assigned when the current symbol is MPS, is given by calculating "A-LSZ", because "A'" indicates the size of probability interval of the current symbol. Next, the probability interval, which is to be assigned in response to the more probable symbol MPS, is compared to a value 8000 Hex indicated by "HALF," in FIG. 9. As a result of the comparison, if the probability interval width is larger than 8000 Hex, the process is finished, otherwise, (re)normalization process is carried out.

Before the normalization process, the probability interval A-LSZ for the more probable symbol MPS and the probability interval LSZ for the less probable symbol LPS are compared to each other, as shown in FIG. 6. As a result of the comparison, if A-LSZ is smaller than LSZ, the probability intervals are exchanged between the more probable symbol MPS and the less probable symbol (conditional exchange) for more efficient encoding operation, as shown in FIG. 9.

Figure 10:
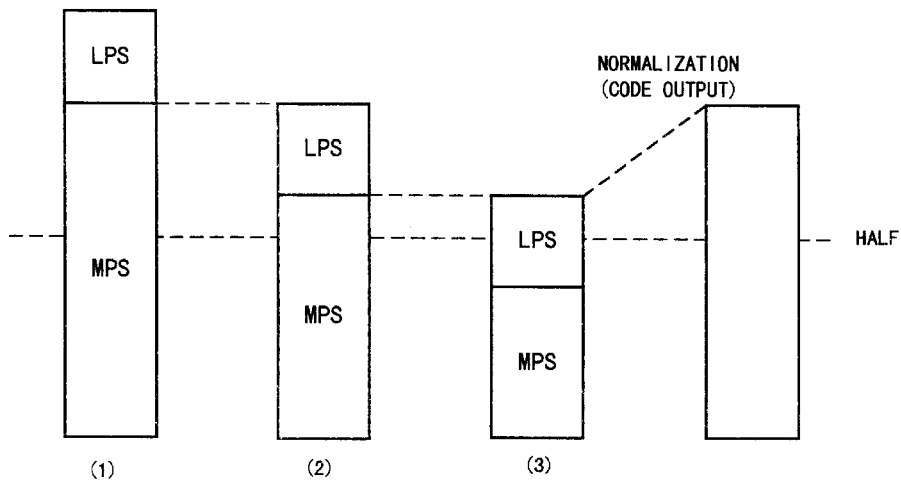

Next, the current state number ST(CX), corresponding to the context data CX, is updated to a transition state number NMPS(ST(CX)), which is read from the probability estimation table 110. The probability estimation table 110 is designed so that the next LSZ to be assigned to the less probable symbol LPS in the following steps are going to be always less than the current LSZ, if the current symbol is MPS. For example, if only the more probable symbols MPS are successively occurred and the less probable symbol LPS is large in size, one normalization process is carried out over three encoding operations (1) to (3) to output one bit code, as shown in FIG. 10.

Figure 11:
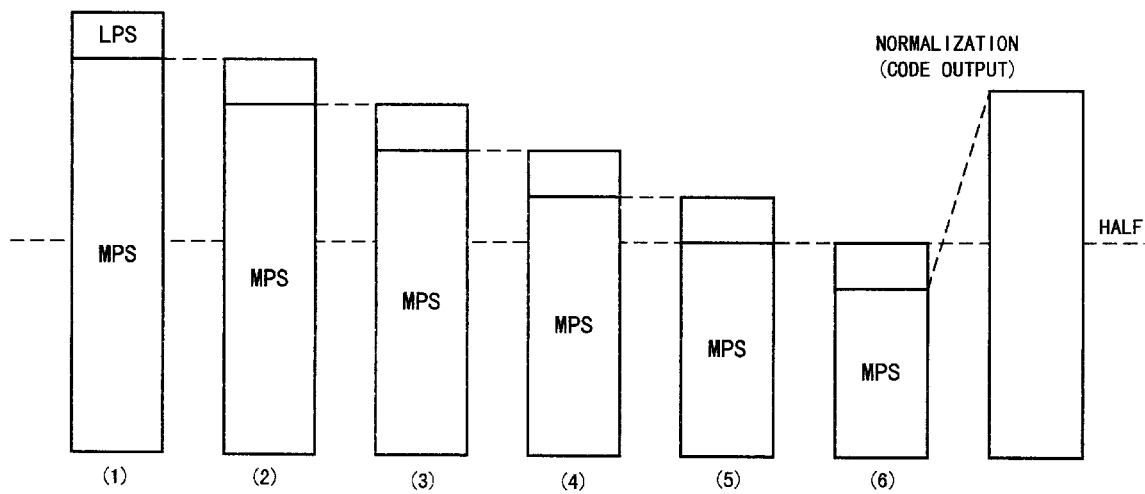

On the other hand, as shown in FIG. 11, one normalization process is performed over six bits of encoding operations to output one bit code, if the less probable symbol LPS is small. In other words, the compression ratio is one-third in the case of FIG. 10, and the compression ratio is one-sixth in the case of FIG. 11. This means that the less probable symbol is smaller, the compression ratio is better (higher), when MPS are successively occurred Consequently, when LSZ is determined smaller, the number of normalization process is reduced per unit data, and the number of output codes is reduced for each normalization process.

Figure 9:
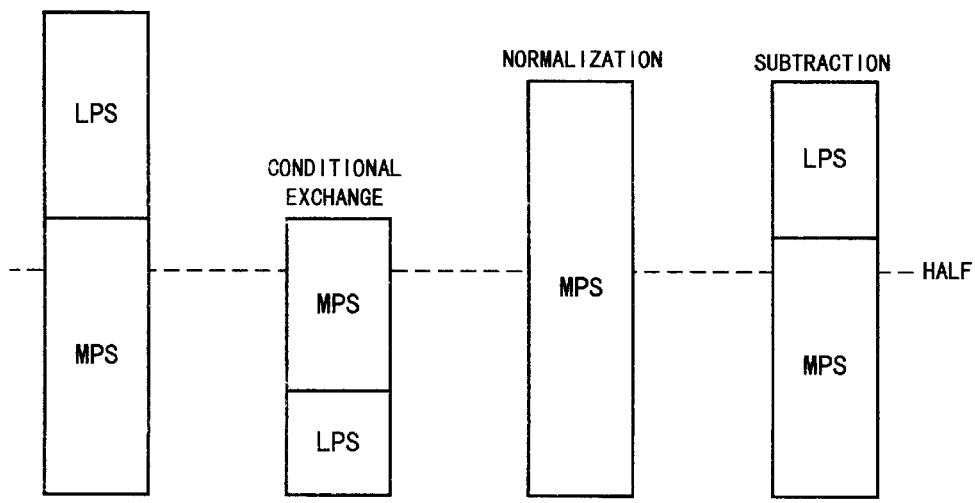

Referring now to FIG. 9, normalization process will be described In normalization process, the more probable symbol MPS whose probability interval is less than 8000 Hex is changed to be more than 8000 Hex. The interval register (A-register) indicates the width of the probability interval which has been assigned to encoded symbol sequences. On the real-number line, the code register (C-register) indicates the lower bound (boundary point) of the probability interval which has been assigned to encoded symbol sequences. Each register value of the interval register and code register is shifted toward the most significant bit (MSB) to double the interval width in the interval register and the lower bound in the code register. The MSB is the leftmost bit in each register.

"8000 Hex" indicates the half point of the maximum interval on the real-number line for the interval register. When the register value of the interval register becomes less than half (8000 Hex), at least one bit at the top of the code register is defined. In the shifting operation of the normalization, codes are outputted from the code register starting with the most significant bit. Such outputted codes are counted by the counter CT, and the counter CT is set to zero, when eight bits of the output codes are counted therein. Then, the eight-bit output codes are outputted byte to byte.

Next, binary arithmetic encoding steps for the symbol of the less probable symbol LPS are described in conjunction with FIG. 7. One difference from the steps for the more probable symbol MPS is that a switch bit determined to the probability estimation table 110 is inspected every time when encoding. Another difference is that the normalization process is carried out every time when the less probable symbol LPS occurs. In addition, when the less probable symbol LPS occurs, LSZ(ST(CX)) is updated to larger value in normalization process of LPS, while LSZ(ST(CX)) is updated to smaller value in normalization process of more probable symbol MPS.

The switch bit indicates whether or not performing exchange operation between the more probable symbol MPS and less probable symbol LPS, when the less probable symbol LPS occurs. The MPS and LPS are stored in the state number/MPS memory 106. Such exchange operation between the more probable symbol MPS and less probable symbol LPS is carried out in order to improve encoding efficiency. At the initial condition of the encoding apparatus, the more probable symbol MEWS in the state number/MPS memory 106 is zero-cleared. In the case where the more probable symbol MPS varies often, the more probable symbol MPS and the less probable symbol LPS are exchanged to each other in accordance with the characteristics of the binary symbol sequence. For example, MPS of value one is appropriate for a context; or a value one is appropriate for a region and a value zero is appropriate for another region in a binary symbol sequence.

As a result, the encoding efficiency is improved. As mentioned above, the normalization process is carried out every time when the less probable symbol LPS occurs, because the value LSZ(ST(CX)) of the less probable symbol LPS is always set to less than 8000 Hex, and the value of the interval register always becomes less than 8000 Hex in response to the less probable symbol LPS.

Figure 12:
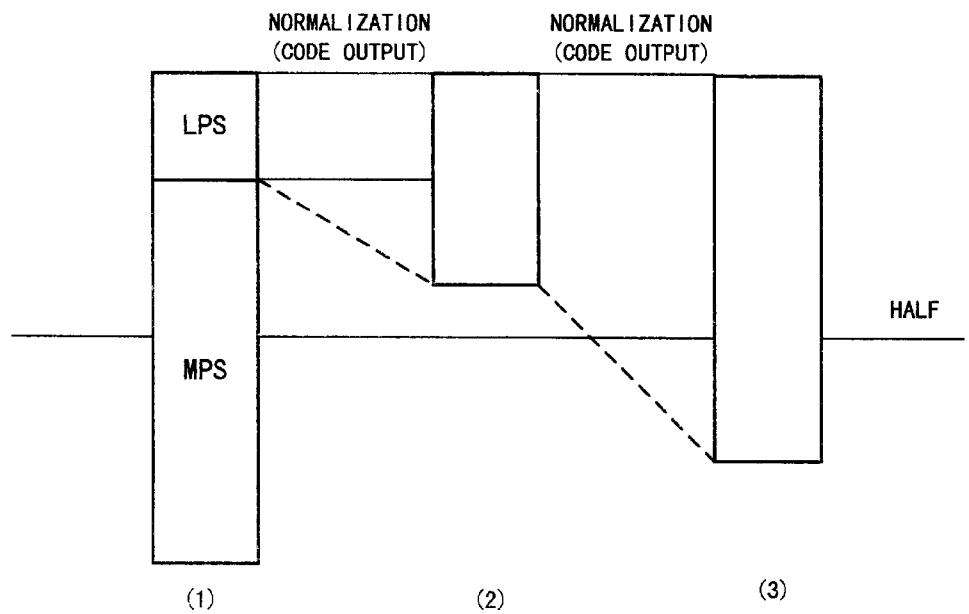
Figure 13:
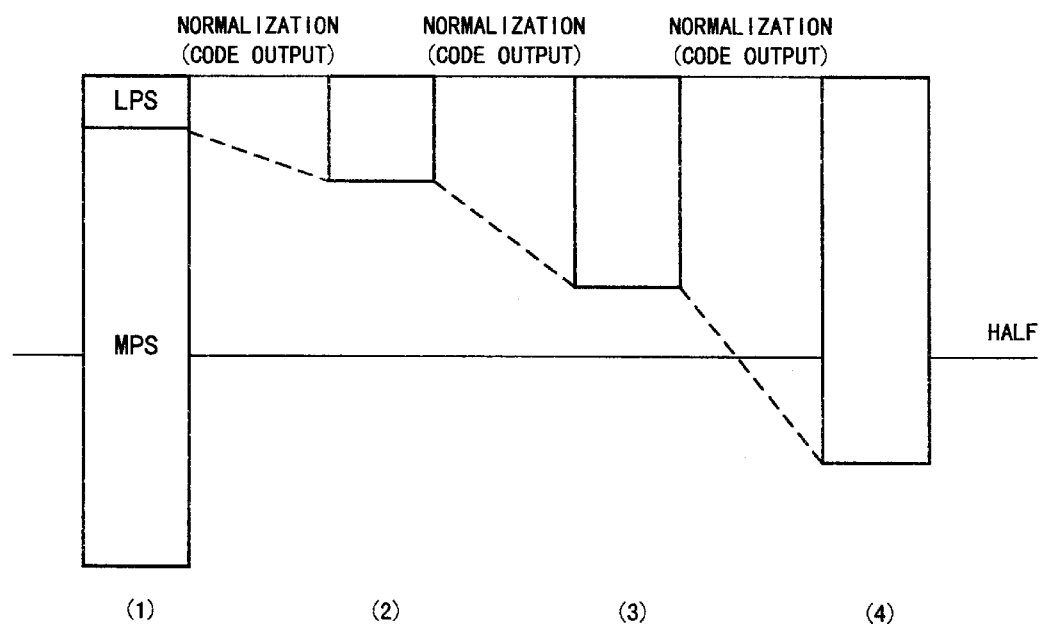

In contrast, for the normalization process of MPS, LSZ (ST(CX)) is updated to a smaller value and LSZ(ST(CX)) is updated to a larger value in normalization process of LPS, because of the following reason. As shown in FIGS. 12 and 13, shift operations of the registers are more required when the interval width of the less probable symbol LPS is small, and a large amount of codes are outputted in response to each normalization process. On the other hand, when a larger interval width is assigned to the less probable symbol LPS, the number of shift operation for the registers in the normalization process is reduced. When the current symbol is less probable symbol LPS for the context, and the current LPS interval is assigned to the symbol in accordance with the estimated probability without change, the encoding efficiency for the next LPS symbol is lowered.

In order to output small number of codes even if many LPS occurr, a state transition process is carried out to make the LSZ(ST(CX)) larger. In the case where the characteristic of the current symbol sequence varies in the middle of the process, such as when a facsmile image including both letters and a picture is read to be encoded, the less probable symbol LPS occurs very often. For that reason, the state transition process is performed to select an appropriate probability interval for the less probable symbol LPS, so that the compression ratio of the image becomes high even though the characteristic of the image varies often in the middle of process.

Figure 14:
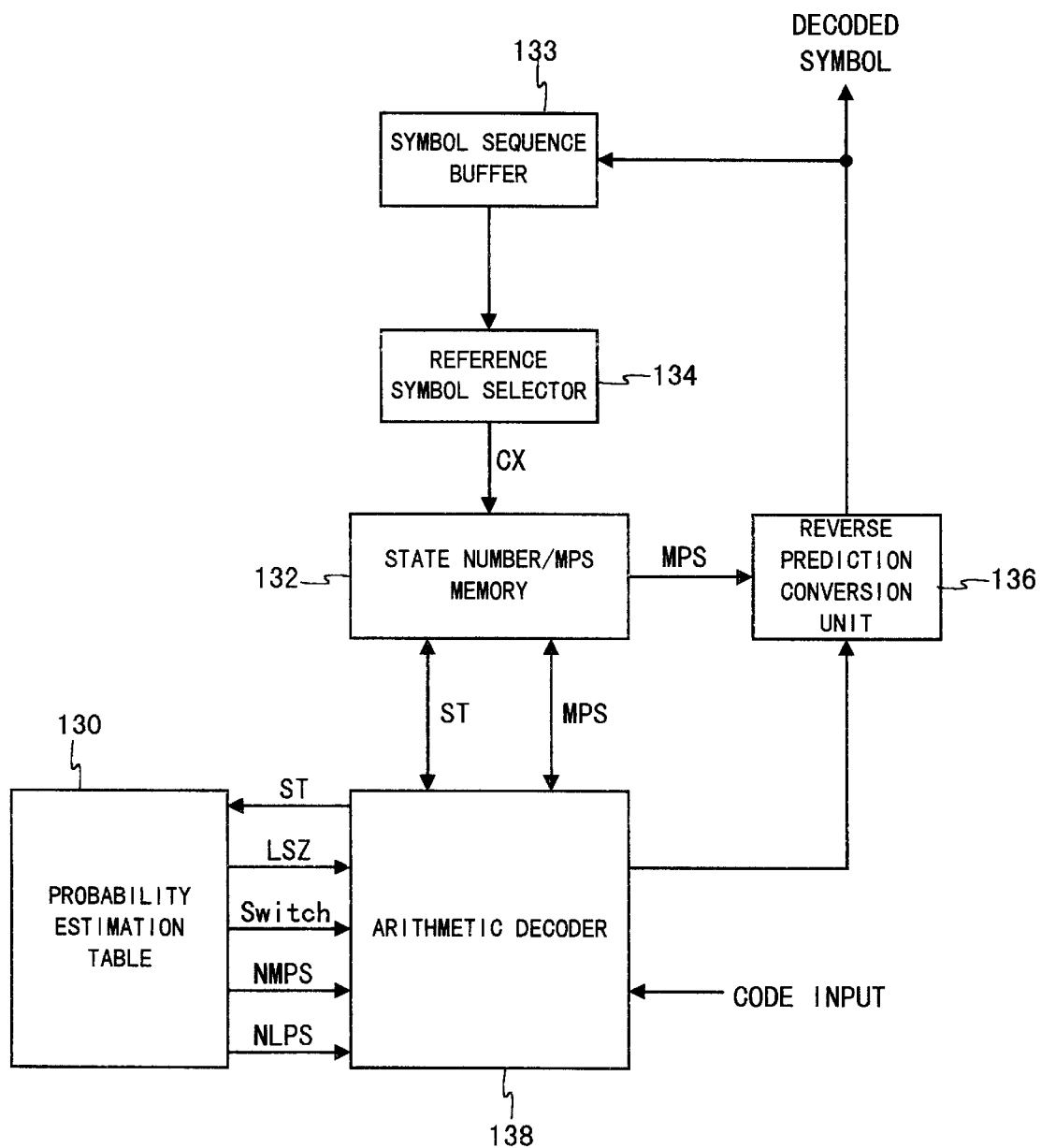
FIG. 14 is a block diagram showing a conventional decoding apparatus.

FIG. 14 shows the structure of a conventional binary arithmetic decoding apparatus, which decodes the code data transmitted from the binary arithmetic encoding apparatus shown in FIG. 1. In FIG. 14, a probability estimation table 130 is designed to have the same contents as the probability estimation table 110, shown in FIG. 1.

The probability estimation table 130 stores information of the optimum probability intervals and of transition state data, which are determined statistically. In the probability estimation table 130, optimum probability intervals are determined for the less probable symbol LPS for each state of context, and the optimum transition state data for the normalization process are determined. A state number/MPS memory 132 is designed to have the same format and same data as those of the state number/MPS memory 106. A symbol sequence buffer 133 stores a decoded binary symbol sequence supplied from a reverse prediction conversion unit 136.

A reference symbol selector 134 selects reference symbols from the decoded binary symbol sequence, stored in the symbol sequence buffer 133, in accordance with the same template as the encoding apparatus, shown in FIG. 1. The reverse prediction conversion unit 136 reproduce the original binary symbol sequence in accordance with the more probable symbol MPS, supplied from the state number/MPS memory 132, and with the symbol to be decoded, supplied from an arithmetic decoder 138.

The arithmetic decoder 138 finds whether the current symbol was MPS or LPS, in accordance with the information of: encoded data, state number and MPS value read from the state number/MPS memory 132, and the probability interval of the less probable symbol LPS and the transition state information read from the probability estimation table 130. The arithmetic decoder 138 performs the state transition process to update the state number/MPS memory 132.

Next, the decoding operation of the binary arithmetic decoding apparatus is now described. For initializing the binary arithmetic decoding apparatus as a whole, the transition states and the MPS values, stored in the state number/MPS memory 132, are set to zero for all the contexts. A code register, indicating the lower bound (boundary point) of the MPS interval on the real-number line, is set to zero and is supplied with code data byte to byte. The lower bound may be called boundary point, code point or subdivision point.

After that, the code register is repeatedly shifted eight bits toward the most significant bit (MSB) three times to initialize the code register itself Then, an interval register (not shown), indicating the probability interval of the more probable symbol MPS, is set to 10000 Hex (maximum probability interval width) to complete initialization of the decoding apparatus as a whole.

The reference symbol selector 134 selects reference symbols to obtain a template which is identical to that of the encoding apparatus, and generates a context for decoding. For starting binary arithmetic decoding operation, the arithmetic decoder 138 reads a state number ST for the current context from the state number/MPS memory 132. The arithmetic decoder 138 reads a probability interval LSZ, corresponding to the state number ST, from the probability estimation table 130. The arithmetic decoder 138 subtracts the probability interval LSZ from the interval register.

Subsequently, the last sixteen bits (CHIGH) at the MSB side in the code register is compared to the value of the interval register after the subtraction. In the interval register, the interval width, which has been divided by the previously-decoded symbols, is stored after being expanded in accordance with the previously-decoded symbols. In other words, the value stored in the interval register has been expanded at the rate proportional to the number of shift operations.

In order to obtain a value held at the last six-teen bits (CHIGH) of the code register, the lower bound of the interval, assigned to the previously-decoded symbol, is subtracted from the approximate value of the lower bound of the probability interval, assigned to the current symbol sequence excluding non-inputted codes; and the subtraction result is expanded at the same rate as the interval register.

The lower bound of the probability interval assigned to the current symbol sequence, is completed when all the codes are inputted into the decoder. The interval register is divided by an estimated interval for the next symbol. The decoding process is performed in accordance with whether the CHIGH register belongs to the more probable symbol MPS side or less probable symbol LPS side as compared to the boundary of the divided interval. In other words, the decoding process is carried out on the basis of the result of comparison between A-LSZ(ST(CX)) and CHIGH.

In the case where the current symbol is the more probable symbol MPS, the next operation is performed by the reverse prediction conversion unit 136 if the interval register is not less than 8000 Hex. If the interval register is less than 8000 Hex, conditional exchange and normalization is performed to the more probable symbol MPS before the operation with the reverse prediction conversion unit 136. On the other hand, if the current symbol is the less probable symbol LPS, the operation is moving into the reverse prediction conversion unit 136 after the normalization.

The normalization in the binary arithmetic decoding apparatus is carried out in the same manner as the binary arithmetic encoding apparatus, as shown in FIG. 9. Either in encoding and decoding process, the interval register and the code register are shifted toward the highest bits (MSB) for normalization process to increase the interval register value of less than 8000 Hex to more than 8000 Hex and to stuff the following codes into the code register if necessary.

Next, the operation of the reverse prediction conversion unit 136 is described. In response to a context supplied from the reference symbol selector 134, the arithmetic decoder 138 reads the more probable symbol MPS for the context, from the state number/MPS memory 132. The more probable symbol MPS is supplied to the reverse prediction conversion unit 136.

The reverse prediction conversion unit 136 compares MPS/LPS information, indicating whether the current symbol is the more probable symbol MPS or less probable symbol LPS, to the more probable symbol MPS value supplied from the state number/MPS memory 132 to reproduce the original symbol. As mentioned before, the state number/MPS memories 106 and 132 are updated in accordance with the characteristics of information source, so that high performance arithmetic encoding/decoding apparatus with improved encoding/decoding ratio can be provided.

Figure 15:
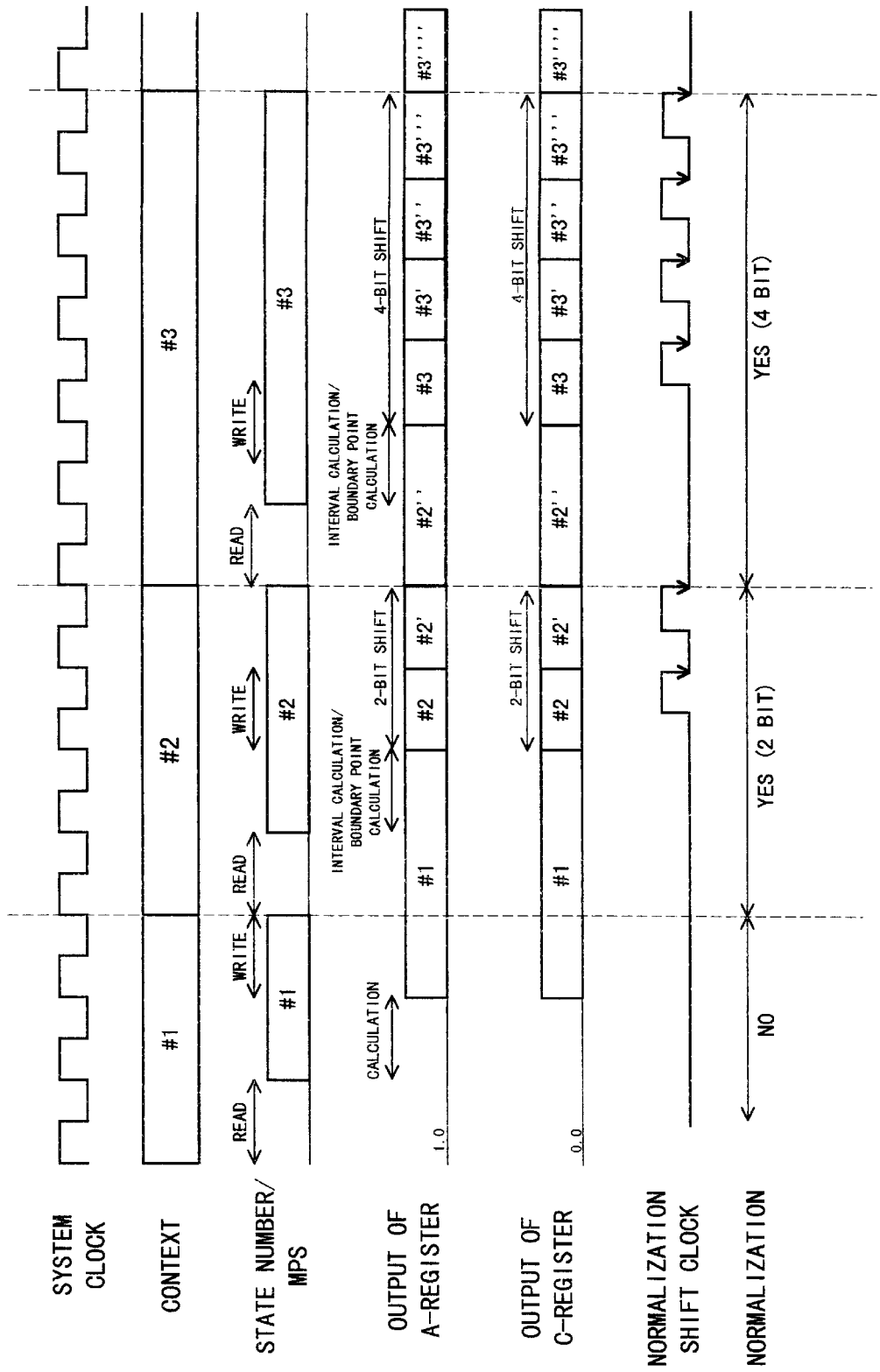
FIG. 15 is a timing chart showing the arithmetic encoding operations of the conventional encoding apparatus.

According to the above-described conventional encoding and decoding apparatuses, the number of shift operations of the interval and code registers for normalization (re-normalization) process is decided depending on the value "A." Namely, one shift operation is performed in the case of 4000 Hex≦A≦7 FFFHex, while fifteen shift operations are performed in the case of A=0001 Hex. As a result, as shown in FIGS. 15 and 16, the normalization (re-normalization) process can not be performed in a constant period of time; and therefore, it becomes difficult to realize real-time encoding.

For solving such a problem, an encoding apparatus has been proposed in Japanese Laying Open Kokai No. H6-121172, which includes a monitor means for monitoring the contents of the interval register A-register), and a shifter means for shifting the data in the interval register a plurality bits at one time, in accordance with the monitored information of the monitor means. With this kind of apparatus, a normalization (re-normalization) process can be performed in one clock cycle (constant period of time), however another problems arise. For normalization process, the interval register (A-register) must be monitored first, then the shift operation is performed. Therefore, it is difficult to improve process speed.

Figure 5:
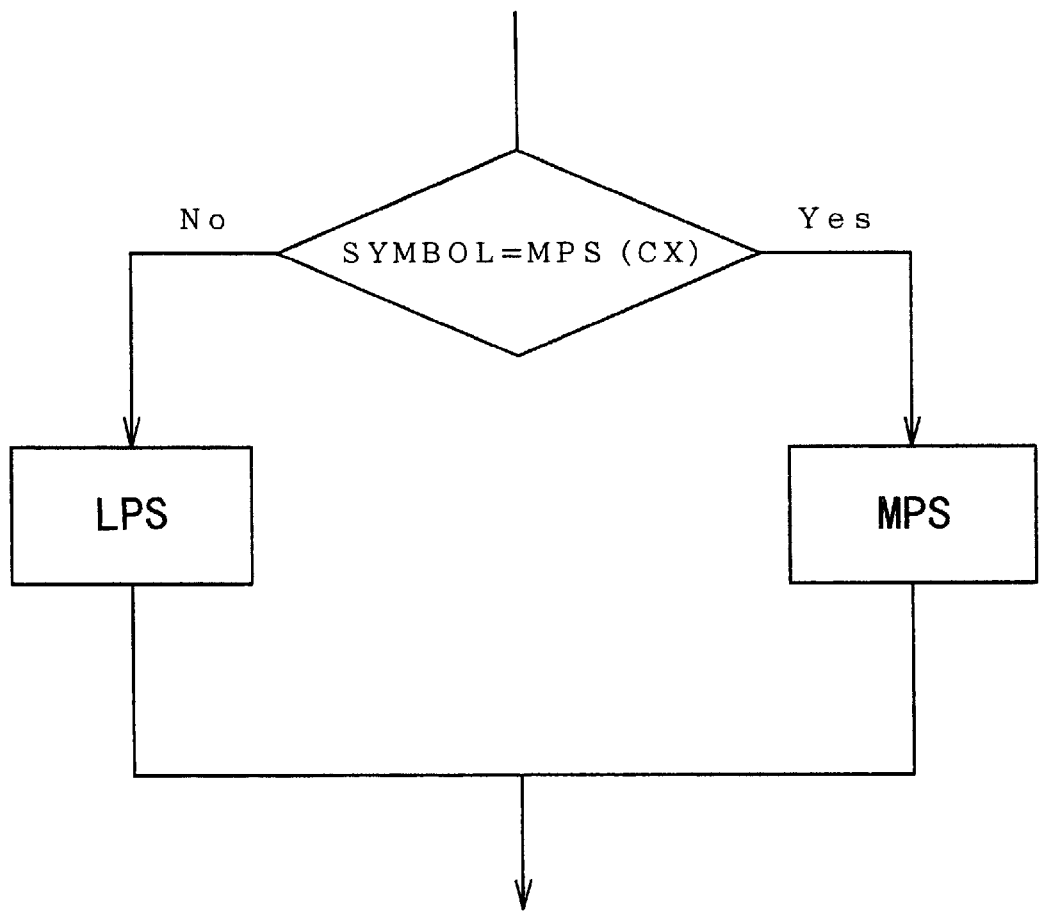
FIGS. 5 to 7 are flow diagrams showing the arithmetic encoding operations.

In addition, it becomes difficult to realize a real-time encoding process if a symbol (image data) to be encoded is inputted for every clock That is because the following three operations are not performed in one cycle: updating the value "A" (FIG. 7), performing prediction conversion process and selecting value "A." The prediction conversion process means an operation for judging whether or not the current symbol is MPS, shown in FIG. 5. The selecting operation of value "A" means to pick up one from A=A-LSZ(ST(CX) and A=LSZ(ST(CX). The prediction conversion process for the current symbol and the update operation of the A-register, on the bases of the decision of A<LSZ(ST(CX)), are performed in a single cycle; then the update operation of the A-register with the normalization of the current symbol is performed in the next cycle. Consequently, it is difficult to realize a real-time encoding if a symbol (image data) to be encoded is inputted for every clock.

Generally in the encoding process, the contents of the C-register may be updated to C+A, at step S3 in FIG. 7 and step S4 in FIG. 6. The update process includes many steps of subtraction calculation of A-LSZ(ST(CX)) at step S1 in FIG. 7 and step S1 in FIG. 6; judgement of A<0x8000 at step S2 in FIG. 6; judgement of A<LSZ(ST(CX)) at step S2 in FIG. 7 and step S3 in FIG. 6; and adding operation of C+A. Therefore, when both interval calculation of the A-register and boundary point calculation of the C-register are performed in the same clock, the clock cycle becomes long and process speed becomes lower.

Basic Theory of the Invention

Next, the basic theory of the invention, which is to be used for each embodiment, is described.

First, the operation in the case where the current image data is not identical to its MPS is described referring again to FIG. 7. If value "A" is not smaller than LSZ(ST(CX)), namely taking Path 1, the value "A" becomes LSZ(ST(CX)). In this case, the amount of shift of registers in normalization process is determined only depending on LSZ, as shown in FIG. 16. Thus, such shift-amounts can be obtained on the basis of the value LSZ in advance. If value "A" is smaller than LSZ(ST(CX)), namely taking Path 2, the shift-amount of the registers in the normalization process is one or two. That is because, the following formulas (1), (2) and (3) can be established in the case of A<LSZ/(ST(CX)), provided that "A" in the right-hand sides of step S1 in FIG. 7 is replaced by "A'":

$$A' \geq 0 \times 8000 \qquad (1)$$

$$A'\text{-LSZ(ST(CX))} < \text{LSZ(ST(CX))} \qquad (2)$$

$$\text{LSZ(ST(CX))} \leq 0 \times 5B12 \qquad (3)$$

On the basis of the formulas (1) and (3), the following formula (4) can be established:

$$0 \times 5B12 \geq A'\text{-LSZ(ST(CX))} \geq 0 \times 24EE \qquad (4)$$

On the basis of the formula (4), it is found that the shift-amount of the registers in the normalization process is one or two when value "A" is smaller than LSZ(ST(CX)). Accordingly, the shift-amount of the registers can be found from the second uppermost (leftmost) bit of the register. If the second uppermost bit is one, the shift-amount is one bit. If the second uppermost bit is zero, the shift-amount is two bits.

Next, the operation of the invention when the current image data is identical to its MPS is described referring to FIG. 6. If value "A-LSZ(ST(CX))" is not smaller than 0x8000, no normalization process is performed and the shift-amount of the registers becomes zero bit. If all the following formulas (5), (6) and (7) are true, namely taking Path 2, the shift-amount becomes one bit, provided that "A" in the right-hand sides of step S1 is replaced by "A'."

$$A' \geq 0 \times 8000 \qquad (5)$$

$$A'\text{-LSZ(ST(CX))} < 0 \times 8000 \qquad (6)$$

$$A'\text{-LSZ(ST(CX))} \geq \text{LSZ(ST(CX))} \qquad (7)$$

On the basis of the formula (5), the following formula (8) can be established:

$$A'/2 \geq 0 \times 4000 \qquad (8)$$

On the basis of the formula (7), the following formula (9) can be established:

$$A'/2 \geq \text{LSZ(ST(CX))} \qquad (9)$$

On the basis of the formulas (8) and (9), the following formula (10) can be established:

$$A' \geq 0 \times 4000 + \text{LSZ(ST(CX))} \qquad (10)$$

On the basis of all the above-described formulas, the following formula (11) can be established:

$$0 \times 8000 < A'\text{-LSZ(ST(CX))} \geq 0 \times 4000 \qquad (11)$$

In accordance with the formula (11), if all the formulas (5), (6) and (7) are true, the shift-amount of the registers is one bit.

If the following formulas (12), (13) and (14) are all true, namely taking Path 3, the shift-amount becomes one bit in the normalization process:

$$A' \geq 0 \times 8000 \qquad (12)$$

$$A'\text{-LSZ(ST(CX))} < 0 \times 8000 \qquad (13)$$

$$A'\text{-LSZ(ST(CX))} < \text{LSZ(ST(CX))} \qquad (14)$$

On the basis of the formula (12), the following formula (15) can be established:

$$A'/2 \geq 0 \times 4000 \qquad (15)$$

Further, on the basis of the formula (14), the following formula (16) can be established:

$$A'/2 < \text{LSZ(ST(CX))} \qquad (16)$$

In addition, on the basis of the formulas (15) and (16), the following formula (17) can be established:

$$\text{LSZ(ST(CX))} > 0 \times 4000 \qquad (17)$$

When all the formulas (12), (13) and (14) are true, the shift-amount in the normalization process becomes one bit.

Consequently, when the current image data is identical to its MPS, the shift-amount can be obtained on the basis of the relation (larger or smaller) between the values "A'-LSZ(ST(CX))" and "0x8000."

Now, preferred embodiments of the invention are described. In the embodiments, basic technique for arithmetic encoding and decoding is corresponding to the conventional apparatus above-described, so that the corresponding elements and operations are not described again in each embodiment for avoiding redundant description.

First Preferred Embodiment

Figure 17:
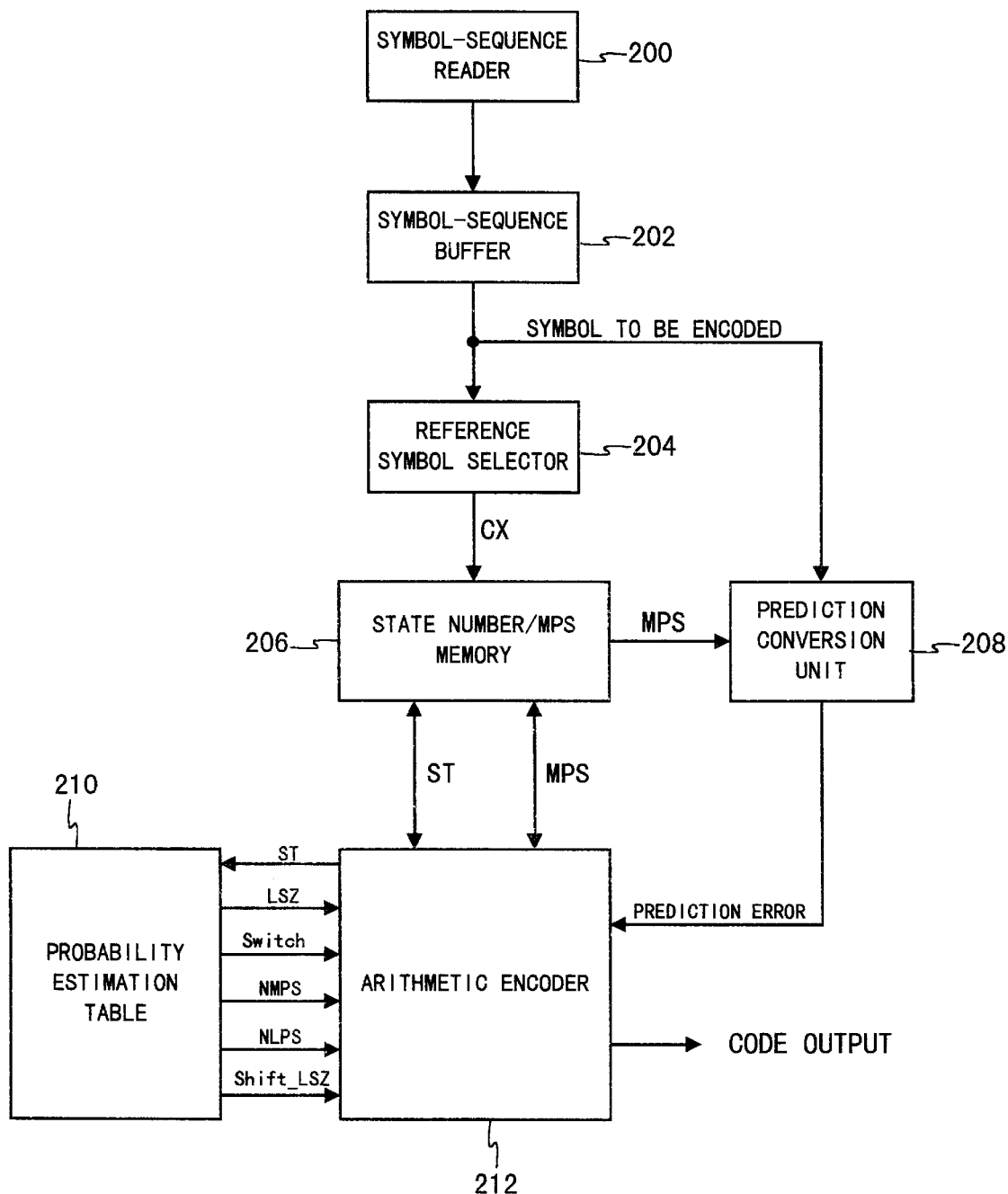
FIG. 17 is a block diagram showing an adaptive type of arithmetic encoding apparatus, according to a first preferred embodiment of the invention.

FIG. 17 shows an encoding apparatus according to a first preferred embodiment, which is for encoding a bi-level image data using adaptive arithmetic encoding technique. The encoding apparatus includes a symbol sequence reader 200 which reads input symbol data as a binary symbol sequence; a symbol sequence buffer 202 connected to the output terminal of the symbol sequence reader 200; and a reference symbol selector 204 connected to the output terminal of the symbol sequence buffer 202. The encoding apparatus further includes a state number/MPS memory 206 which stores data shown in FIG. 2, and a prediction conversion unit 208. "MPS" is a prediction value of the current symbol. The prediction conversion unit 208 finds whether or not the current symbol is identical to its more probable symbol MPS stored in the state number/MPS memory 206, in accordance with the contents of context data CX composed of reference symbols selected by the reference symbol selector 204.

In FIG. 17, a reference number 210 represents a probability estimation table which stores, for each state number ST, a probability interval (LSZ) of a less probable symbol LPS and transition information of the state number ST. "LPS" represents the opposite value to the more probable symbol MPS for the current symbol. FIG. 18 shows the contents of the probability estimation table 210. As shown in FIG. 18, the probability estimation table 210 stores for each state number shift amount (Shift_LSZ) of an interval register (A-register) for an estimated value (LSZ) of the less probable symbol LPS. This is one feature of the embodiment. The shift amount Shift_LSZ may be called potential shift-amount.

A reference number 212 represents an arithmetic encoder which arithmetically encodes symbols in accordance with an output signal of the prediction conversion unit 208, the state number ST and the more probable symbol MPS, read from the state number/MPS memory 206, and the probability interval LSZ of the less probable symbol LPS and the transition state information read from the probability estimation table 210.

For performing binary arithmetic encoding, the encoding apparatus is first initialized as a whole. Namely, all the state numbers ST and all the MPS values stored in the state number/MPS memory 206 are set to zero for all the contexts CX.

Next, the width of the probability interval of the more probable symbol MPS, which is indicated by the interval register (A-register) shown in FIG. 4, is set to 10000 Hex. The lower bound (boundary point) of the MPS interval "A" on the real-number line, which is indicated by the code register (C-register) shown in FIG. 4, is set to zero. A counter CT, which counts the number of shifting operations for code output (byte-out), is set to 11. In accordance with the above-mentioned template, the reference symbol selector 204 loads both the current symbol and the context from the binary symbol sequence, stored in the symbol sequence buffer 202.

Next, the binary arithmetic encoding operation starts. In accordance with the flow chart shown in FIG. 5, the prediction conversion unit 208 first compares the current symbol to the MPS value MPS(CX) corresponding to the current context data CX, stored in the state number/MPS memory 206. If the current symbol is identical to the MPS (CX), it can be said that the symbol is MPS, and the processing shown in FIG. 6 is performed If the current symbol is different from the MPS (CX), it can be said that the symbol is LPS, and the processing shown in FIG. 7 is performed As shown in FIG. 6, when the current symbol is MPS, the arithmetic encoder 212 calculates an interval width for the more probable symbol MPS as "A-LSZ(ST(CX)", where the current status of the context data CX is ST(CX) and an interval width given to the less probable symbol LPS is "LSZ." This calculation can be understood easily from FIG. 8. A probability interval width "A", corresponding to the probability of already-encoded symbol sequence, is divided at a ratio corresponding to the more probable symbol MPS and less probable symbol LPS for the current symbol. If the estimated probability of the more probable symbol MPS is larger than that of the less probable symbol LPS, the interval of the more probable symbol MPS is given to the current symbol, as shown in FIG. 8.

In FIG. 8, a probability interval width, which is to be assigned when the current symbol is MPS, is given by calculating "A-LSZ", because "A'" indicates the size of probability interval of the current symbol. Next, the probability interval, which is to be assigned in response to the more probable symbol MPS, is compared to a value 8000 Hex indicated by "HALF," in FIG. 9. As a result of the comparison, if the probability interval width is larger than 8000 Hex, the process is finished, otherwise, (re) normalization process is carried out.

Figure 19:
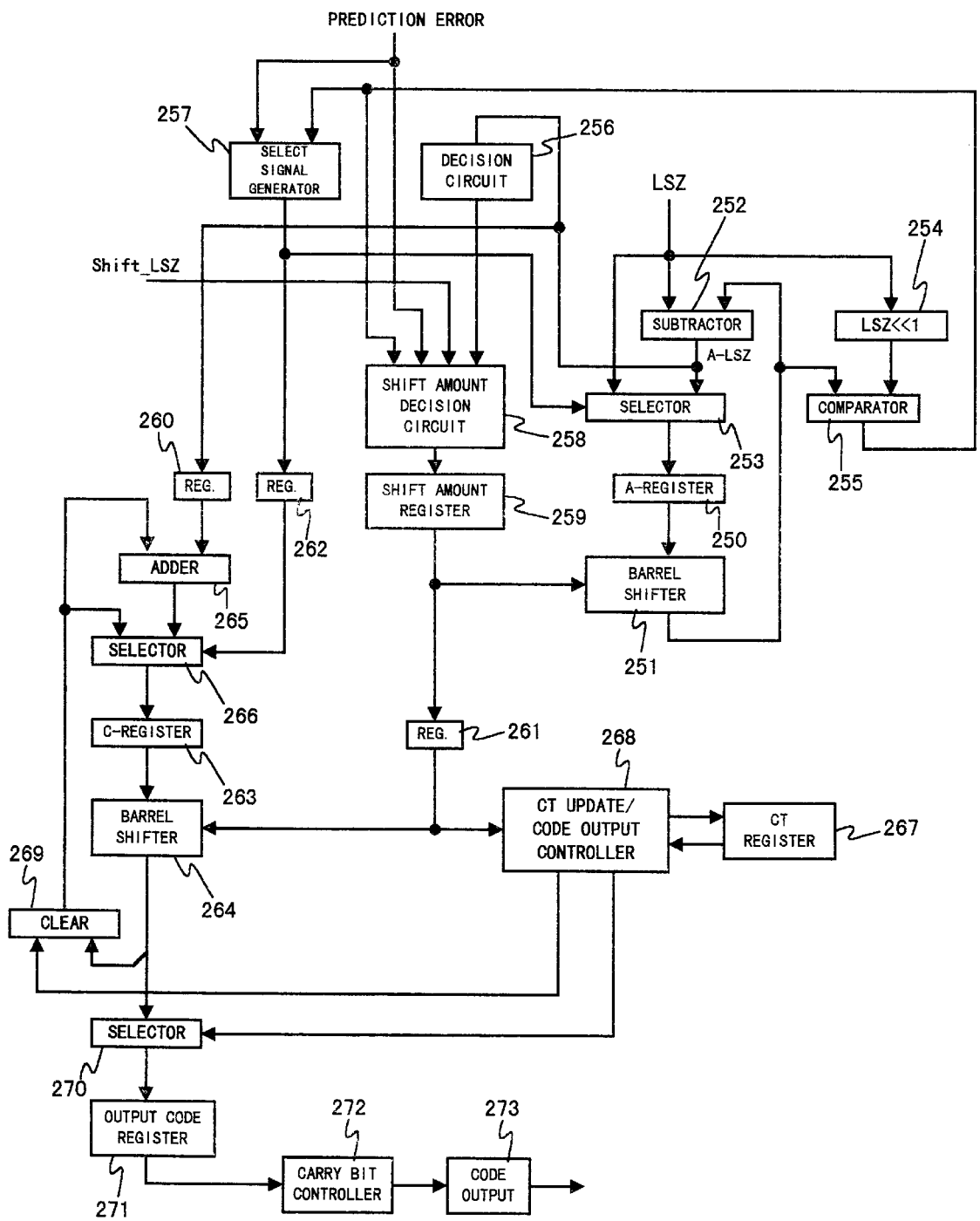
FIG. 19 is a block diagram showing an arithmetic encoder used in the encoding apparatus, shown in FIG. 17.

FIG. 19 shows the structure of an encoder contained in the arithmetic encoder 212. In FIG. 19, a reference number 250 represents a 16-bit type of interval register (A-register) which stores a probability interval of the symbol sequence. A reference number 251 represents a barrel shifter which shifts the data in the interval register 250. The barrel shifter 251 is designed to shift a plurality of bits at one time. A reference number 252 represents a 16-bit type of subtractor, which is supplied with the output of the barrel shifter 251 and an estimated value LSZ of the probability interval of the less probable symbol LPS. The estimated value LSZ is supplied from the probability estimation table 210. The subtractor 252 calculates a probability interval (A-LSZ), which is assigned when the more probable symbol occurs. A reference number 253 represents a selector which selects one from the output (A-LSZ) of the subtractor 252 and the estimated value LSZ, supplied from the probability estimation table 210. The output of the selector 253 is stored in the A-register 250.

Figure 20:
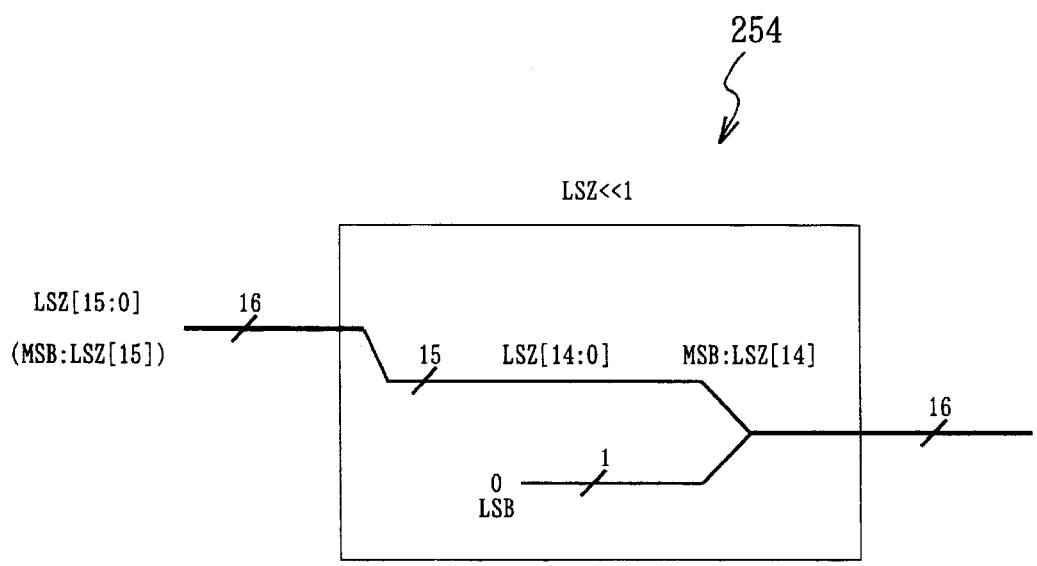
FIG. 20 is an explanatory diagram showing the structure of a shifter used in the arithmetic encoder shown in FIG. 19.

A reference number 254 represents a shift operation circuit which shifts the estimated value LSZ one bit to left to double the value LSZ. FIG. 20 shows the structure of the shift operation circuit 254. A reference number 255 represents a comparator which compares the outputs of the shift operation circuit 254 and the barrel shifter 251. That is, the comparator 255 compares the intervals A-LSZ and LSZ, which are respectively assigned when the more probable symbol MPS and the less probable symbol LPS occur.

A reference number 256 represents a decision circuit which compares the output of the subtractor 252 to a value "0x8000" to find which is larger. A reference number 257 represents a select signal generator which generates a select signal controlling the operation of the selector 253, on the basis of the a prediction error signal from the prediction conversion unit 208 and of the comparison result of the comparator 255. When the current symbol is MPS and A-LSZ<LSZ, the selector 253 selects LSZ. When the current symbol is MPS and A-LSZ≧LSZ, the selector 253 selects the output of the subtractor 252. On the other hand, if the current symbol is not MPS and A-LSZ<LSZ, the selector 253 selects the output of the subtractor 252. If the current symbol is not MPS and A-LSZ≧LSZ, the selector 253 selects LSZ.

A reference number 258 represents a shift-amount decision circuit which decides the shift amount (actual shift-amount) of the A-register 250, on the basis of the prediction error signal from the prediction conversion unit 208, the $15^{th}$ bit of the output of the subtractor 252, the output of the decision circuit 256, and of the comparison result of the comparator 255. In the output of the subtractor 252, the $16^{th}$ bit is MSB (Most Significant Bit). The shift-amount decision circuit 258 outputs a shift amount of zero, when the current symbol is identical to its MPS and A-LSZ≧0x8000. When the current symbol is identical to its MPS and A-LSZ<0x 8000, the shift-amount decision circuit 258 outputs a shift amount of one. On the other hand, if the current symbol is not identical to its MPS and A-LSZ<LSZ (Path 2 in FIG. 7) and the $15^{th}$ bit of the subtractor 252 holds one, the shift-amount decision circuit 258 outputs a shift amount of one.

When the current symbol is not identical to its MPS and A-LSZ<LSZ (Path 2 in FIG. 7) and the 15$^{th}$ bit of the subtractor 252 holds zero, the shift-amount decision circuit 258 outputs a shift amount of two. When the current symbol is not identical to its MPS and A-LSZ≧LSZ (Path 1 in FIG. 7), the shift-amount decision circuit 258 outputs a value Shift_LSZ (potential shift-amount), supplied from the probability estimation table 210.

A reference number 259 represents a shift amount register which stores the output (actual shift-amount) of the shift-amount decision circuit 258. The output of the shift amount register 259 is supplied to the barrel shifter 251. Reference numbers 260, 261 and 262 are registers which hold the output of the subtractor 252, the output of the shift amount register 259 and the output of the select signal generator 257, respectively. A reference number 263 represents a code register (C-register) which stores a code data. The code register 263 is supplied with the output of a selector 266. A reference number 264 represents another barrel shifter which shifts the C-register 263 bits corresponding to the data stored in the register 261.

An adder 265 is supplied with the outputs of the register 260 and the barrel shifter 264 to add them up. The selector 266 selects one from the output of the adder 265 and the output of a clear circuit 269, in accordance with the select signal supplied through the register 262 from the select signal generator 257. A reference number 267 represents a CT register which stores a counted value (CT), which is updated in accordance with the currently stored data therein and the data in the shift amount register 261. FIG. 21 shows the values to be stored in the CT register 267.

Figure 22:
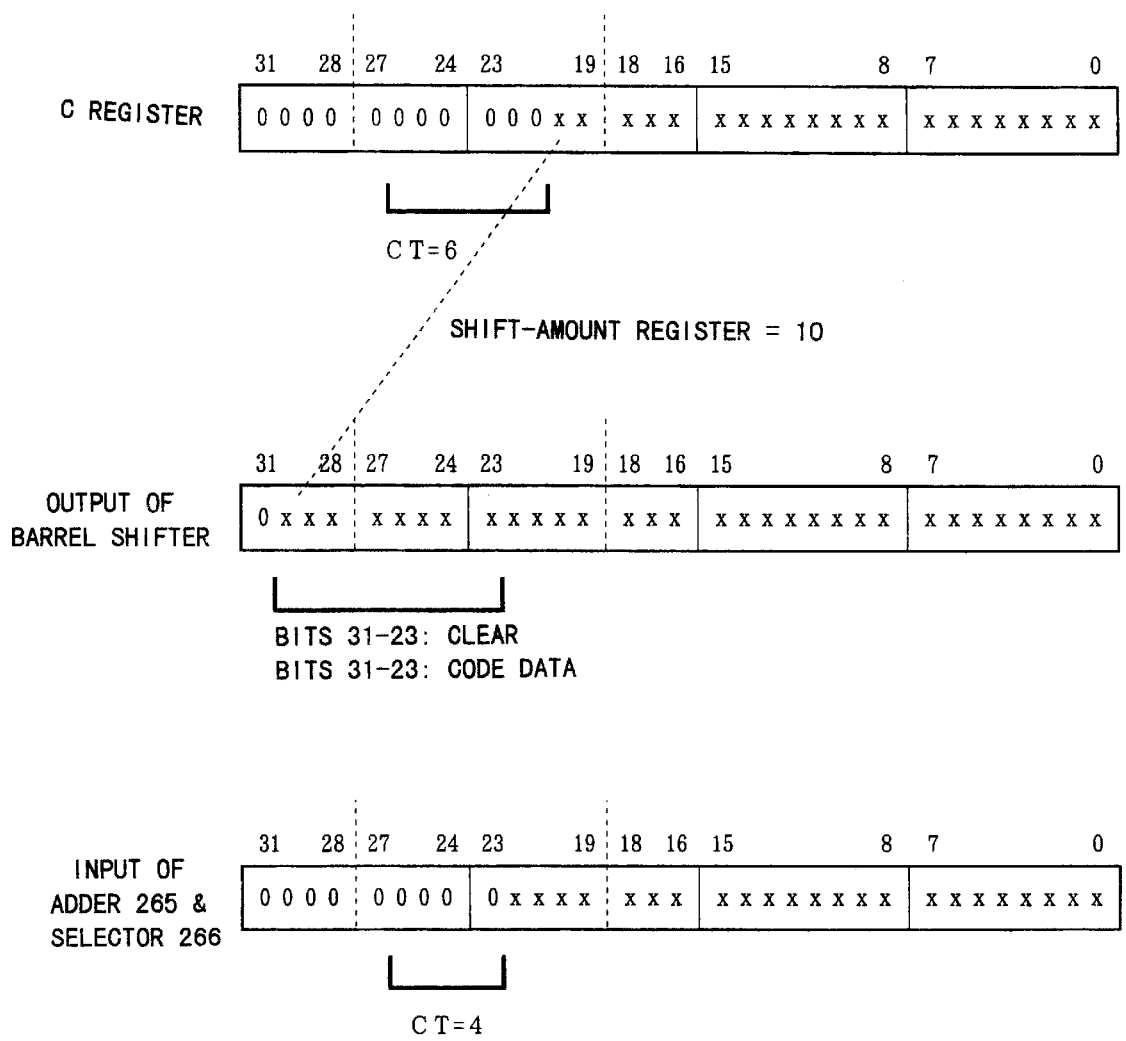
FIGS. 22 and 23 are explanatory diagrams showing the operation of the embodiment.
Figure 23:
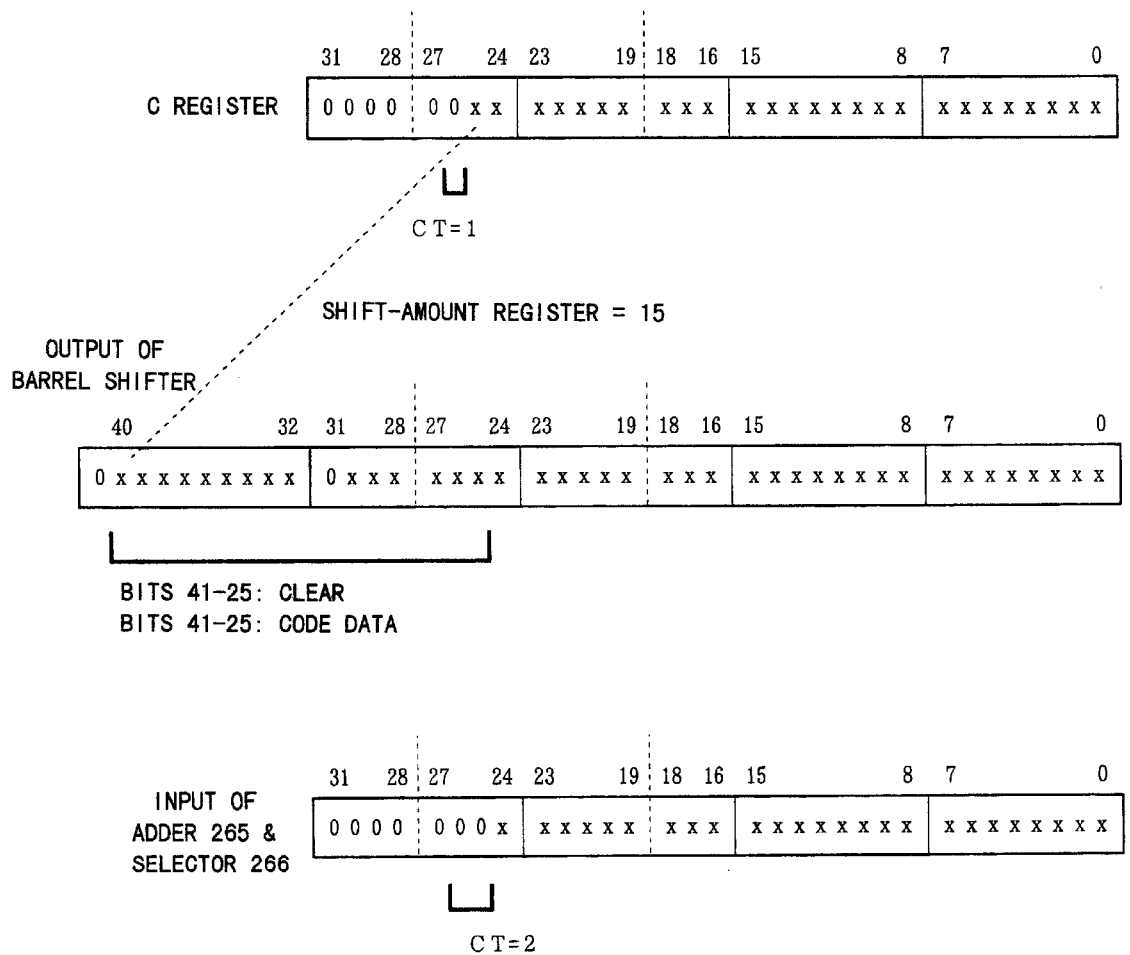

A reference number 268 represents a CT update/code output controller which updates the CT register 267 in accordance with the table shown in FIG. 21. As shown in FIGS. 22 and 23, when an output code is generated, a part of the output of the barrel shifter 264 is required to be zero-cleared. The CT update/code output controller 268 supplies a signal telling the clear circuit 269 which bits are to be cleared in the output of the barrel shifter 264. The CT update/code output controller 268 farther supplies a signal telling a selector 270 which bits are to be outputted as code output from the barrel shifter 264.

The clear circuit 269 clears the designated bits in the output of the barrel shifter 264, in accordance with the signal from the CT update/code output controller 268. The selector 270 takes out the output code (code data) from the output of the barrel shifter 264, in accordance with the signal from the CT update/code output controller 268. A register 271 stores the output of the selector 270. Reference numbers 272 and 273 represent a carry bit controller and a code output circuit, respectively. The final output code (code data) is outputted from the code output circuit 273.

FIG. 22 shows the shift operation in the case where the shift amount of the C-register 263 is ten bits and the count value of the CT register 267 is six. FIG. 23 shows the shift operation in the case where the shift amount of the C-register 263 is thirteen bits and the count value of the CT register 267 is one. When a code data is outputted (BYTEOUT), the code data is taken out from the output data of the barrel shifter 264 and the other bits are zero-cleared by the dear circuit 269. The code data (output code) is taken out from a various locations in the C-register 263. The location is determined based on the shift amount of the barrel shifter 264 and the count value (CT value) of the CT register 267.

According to the above-described first preferred embodiment, the barrel shift operation is performed in one dock without monitoring the data in the A-register 250. That is, a shift amount to be assigned when LSZ is selected for the A-register 250 has been stored in the probability estimation table 210 in advance. When the operation runs through Path 1 in FIG. 7, the barrel shift amount "Shift_LSZ" stored in the probability estimation table 210 is selected. The selected shift amount is stored in the shift amount register 259. When the operation runs through Path 2 in FIG. 7, a shift amount of one or two, which is decided on the basis of the second leftmost bit of A-LSZ, is selected. The selected shift amount is stored in the shift amount register 259. When the operation runs through Path 1 in FIG. 6, no normalization is performed, and a shift amount of zero is stored in the shift amount register 259. When the operation runs through Path 2 or Path 3 in FIG. 6, a shift amount of one is stored in the shift amount register 259. Thus, all the possible shift amounts are stored in the shift amount register 259, so that the barrel shift operation can be performed immediately at the beginning of one clock cycle. As a result, normalization process can be performed at a high speed, and therefore, encoding speed can be improved.

Figure 24:
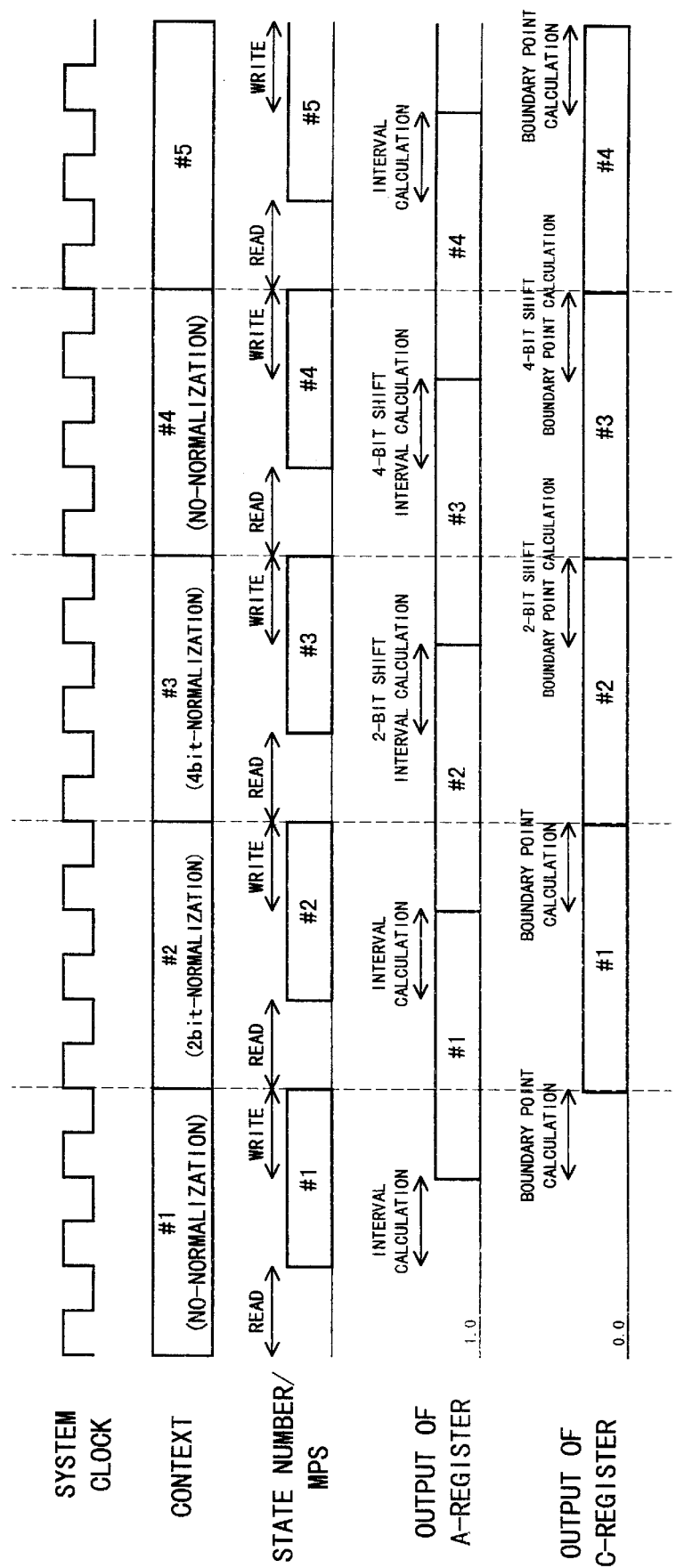
FIG. 24 is a timing chart showing the operation of the embodiment.

FIG. 24 shows the operations of interval calculation and normalization (shift) to the interval register (A-register) 250 and of boundary-point calculation and normalization (shift) to the code register (C-register) 263. In this embodiment, the interval calculation and normalization to the A-register 250 are performed in one clock regardless of the number of shift in normalization process. The boundary-point calculation and normalization to the C-register 263 are performed in one clock regardless of the number of shift in normalization process as well. A symbol to be encoded is inputted every three system clocks.

In the first clock, a state number ST and a prediction value MPS for a context #1 are read from the state number/MPS memory 206. In the second clock, the arithmetic encoder 212 performs interval calculation to the context #1. Next, in the third clock, the result of the interval calculation is stored in the A-register 250, and the state number/MPS memory 206 is updated in accordance with the data stored in the A-register 250. Further in the third clock, the boundary point calculation for the context #1 is performed In the fourth clock, the result of the boundary point calculation is stored in the C-register 263. Further in the fourth clock, state number ST and prediction value MPS of a context #2 are read from the state number/MPS memory 206. In the fifth clock, interval calculation for the context #2 is performed using the information (ST, MPS), read from the state number/MPS memory 206. In the sixth clock, the result of the interval calculation in the fifth clock is stored in the A-register 250. Further in the sixth clock, the state number and MPS of the context #2 in the state number/MPS memory 206 are updated.

In the seventh dock, the result of the boundary-point calculation for the context #2 in the sixth dock is stored in the C-register 263. Further in the seventh dock, state number ST and prediction value MPS of a context #3 are read from the state number/MPS memory 206. In the eighth clock, the output of the A-register 250 is shifted two bits to the left (upper side), and interval calculation of the context #3 is performed in accordance with the shifted data and the information read from the state number/MPS memory 206 in the seventh dock.

In the ninth clock, the result of the interval calculation in the eighth clock is stored in the A-register 250. Further in the ninth dock, the state number and MPS of the context #3 in the state number/MPS memory 206 are updated in accordance with the result of the interval calculation. Further more, the boundary-point data of the context #2 stored in the C-register 263 is shifted two bits to the left (upper side), and boundary-point calculation of the context #3 is performed.

According to the embodiment, encoding process for each context can be performed in a fixed clock rate (three docks) regardless of the shift amount in normalization process. That is, the normalization process and interval calculation process (A-LSZ) to the A-register 250 can be performed in a single dock cycle, because the output of the barrel shifter 251 is supplied to the subtractor 252. Further, the output of the register 260 is supplied to the adder 265, so that the interval calculation (A-LSZ) of the A-register 250 and the boundary-point calculation (C+(A-LSZ)) of the C-register 263 can be performed in the different clock cycles. Therefore, the clock cycle (clock frequency) can be shortened. In addition, the output of the clear circuit 269 is supplied to the adder 265, so that the normalization process and boundary-point calculation (C+(A-LSZ)) to the C-register 263 can be performed in a single clock cycle. Therefore, all the processes to the C-register 263 can be performed in a fixed period of time.

The output of the barrel shifter 251 and the output data of the shift operation circuit 254 are compared to each other, therefore, a generally-needed subtractor which calculate the interval (A-LSZ), assigned when the current symbol is MPS, can be omitted. As a result, the time for comparing the intervals (A-LSZ) and (LSZ) can be shortened to almost half as compared to the conventional apparatus.

Second Preferred Embodiment

Figure 25:
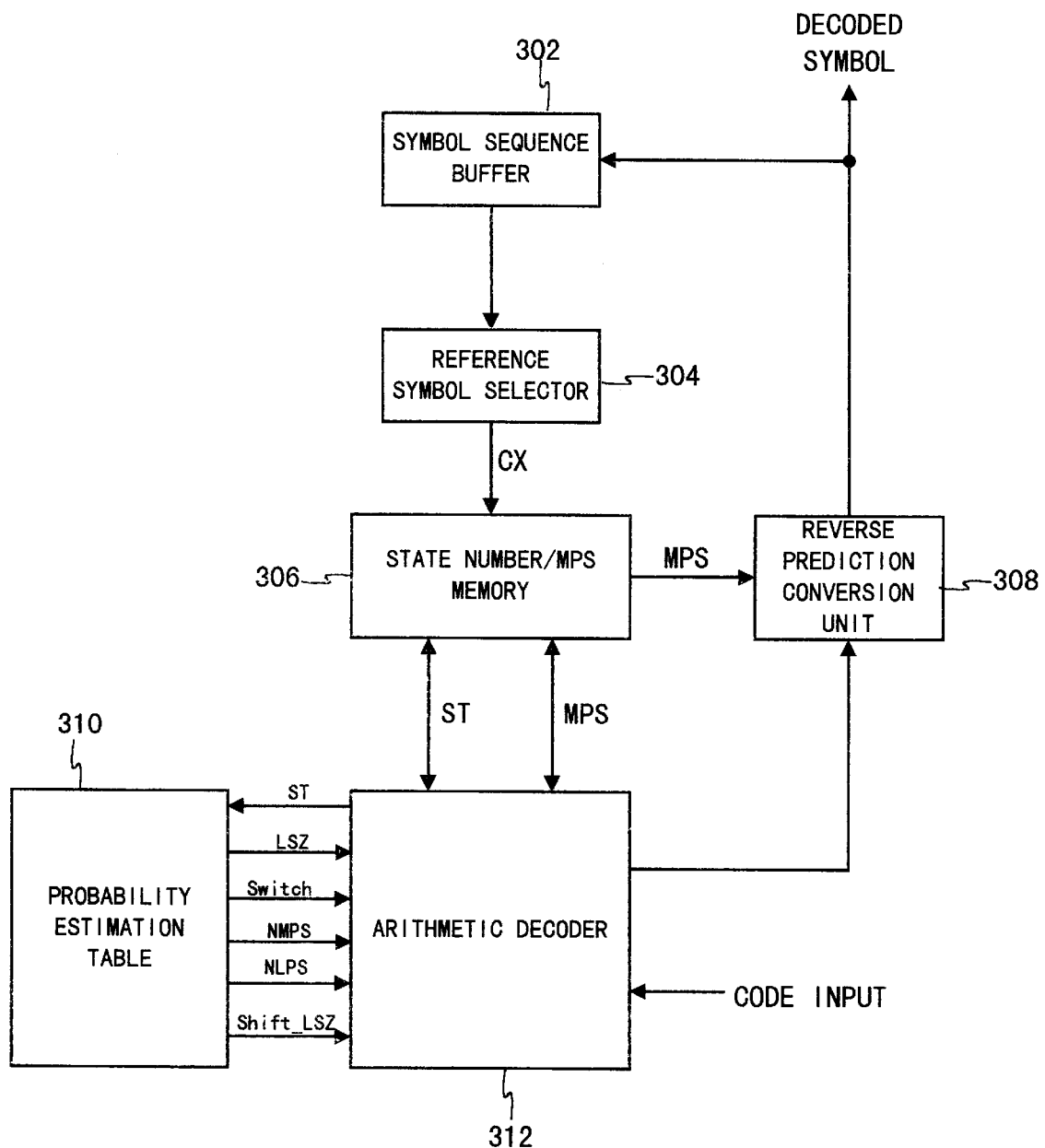
FIG. 25 is a block diagram showing a decoding apparatus, according to a second preferred embodiment of the invention.

FIG. 25 shows the structure of a binary arithmetic decoding apparatus, according to a second preferred embodiment, which decodes the code data transmitted from the arithmetic encoding apparatus shown in FIG. 17. In FIG. 25, a probability estimation table 310 is designed to have the same contents as the probability estimation table 210, shown in FIG. 18.

The probability estimation table 310 stores information of the optimum probability intervals and of transition state data, which are determined statistically. In the probability estimation table 310, optimum probability intervals are determined for the less probable symbol LPS for each state of context, and the optimum transition state data for the normalization process are determined. A state number/MPS memory 306 is designed to have the same format and same data as those of the state number/MPS memory 206 of the encoding apparatus. A symbol sequence buffer 302 stores decoded binary symbol sequence supplied from a reverse prediction conversion unit 308.

A reference symbol selector 304 selects reference symbols from the decoded binary symbol sequence, stored in the symbol sequence buffer 302, in accordance with the same template as the encoding apparatus. The reverse prediction conversion unit 308 reproduce the original binary symbol sequence in accordance with the more probable symbol MPS, supplied from the state number/MPS memory 306, and with the symbol to be decoded, supplied from an arithmetic decoder 312.

The arithmetic decoder 312 finds whether the current symbol was MPS or LPS, in accordance with the information of: encoded data, state number and MPS value read from the state number/MPS memory 306, and the probability interval of the less probable symbol LPS and the transition state information read from the probability estimation table 310. The arithmetic decoder 312 performs the state transition process to update the state number/MPS memory 306.

Next, the decoding operation of the decoding apparatus is described. For initializing the binary arithmetic decoding apparatus as a whole, the transition states and the MPS values, stored in the state number/MPS memory 306, are set to zero for all the contexts. A code register, indicating the lower bound of the MPS interval on the real-number line, is set to zero and is supplied with code data byte to byte.

After that, the code register is repeatedly shifted eight bits toward the most significant bit (MSB) three times to initialize the code register itself. Then, an interval register (not shown), indicating the probability interval of the more probable symbol MPS, is set to 10000 Hex (maximum probability interval width) to complete initialization of the decoding apparatus as a whole.

The reference symbol selector 304 selects reference symbols to obtain a template which is identical to that of the encoding apparatus, and generates a context for decoding. For starting binary arithmetic decoding operation, the arithmetic decoder 312 reads a state number ST for the current context from the state number/MPS memory 306. The arithmetic decoder 312 reads a probability interval LSZ, corresponding to the state number ST, from the probability estimation table 310. The arithmetic decoder 312 subtracts the probability interval LSZ from the interval register. After that, the decoding process is performed in the same manner as the encoding process above described.

In response to a context supplied from the reference symbol selector 304, the arithmetic decoder 312 reads the more probable symbol MPS for the context, from the state number/MPS memory 306. The more probable symbol MPS is supplied to the reverse prediction conversion unit 308.

The reverse prediction conversion unit 308 compares MPS/LPS information, indicating whether the current symbol is the more probable symbol MPS or less probable symbol LPS, to the more probable symbol MPS value supplied from the state number/MPS memory 306 to reproduce the original symbol.

According to the second preferred embodiment, it is clear that the same advantages as the first preferred embodiment are provided. The encoding apparatus of the first embodiment and the decoding apparatus of the second embodiment may be combined to provide an apparatus including both encoding function and decoding function, such as a facsimile machine.

Third Preferred Embodiment

Figure 26:
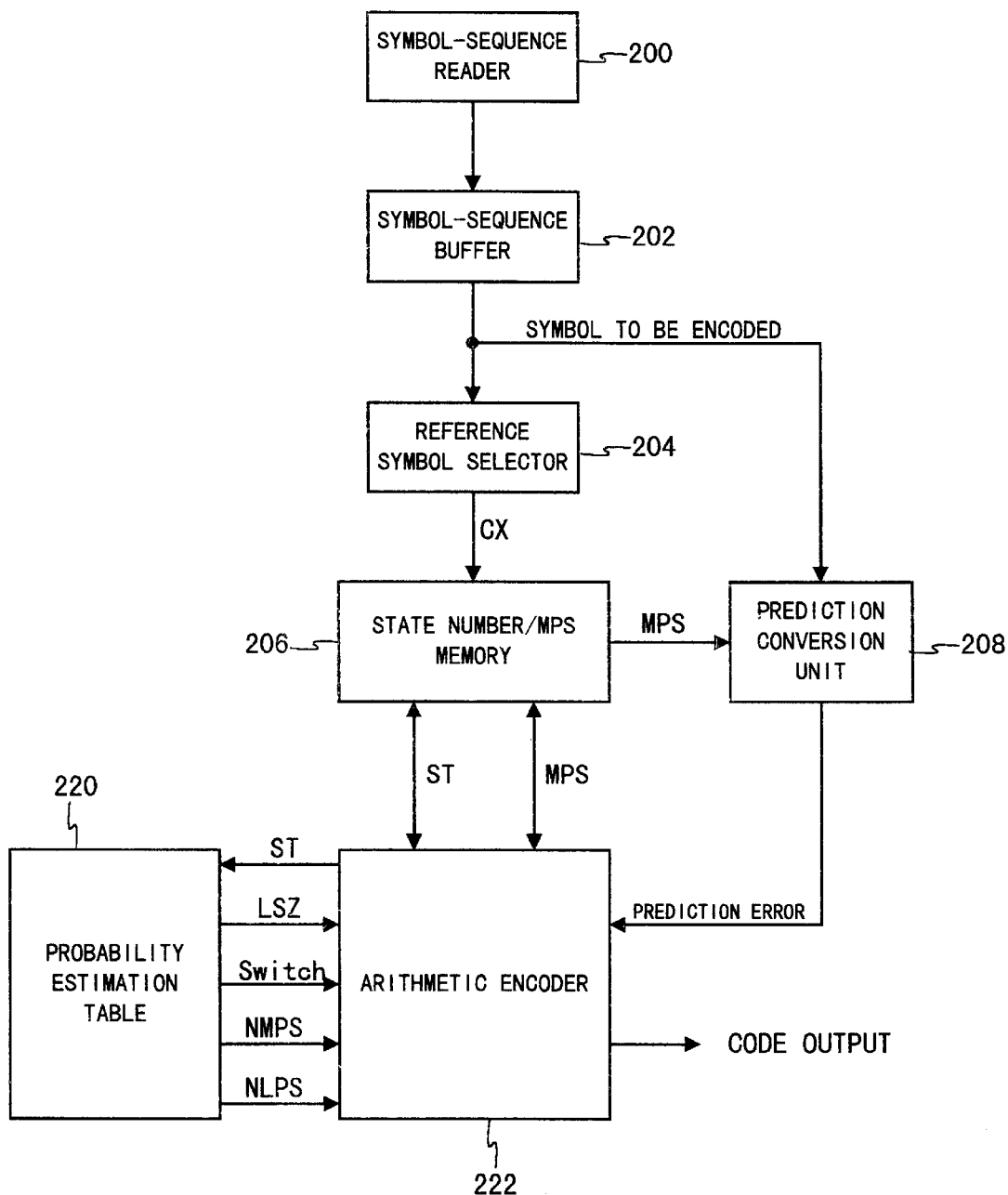
FIG. 26 is a block diagram showing an encoding apparatus, according to a third preferred embodiment of the invention.

FIG. 26 shows an encoding apparatus according to a third preferred embodiment of the invention. The third preferred embodiment is designed to be similar to the first preferred embodiment, shown in FIG. 17, so that most elements are the same. The most significant difference between the first and third preferred embodiments is on an arithmetic encoder 222. The same or corresponding elements to the first embodiment are symbolized with the same reference numbers. For avoiding redundant description, the same description is not repeated but the difference is only described In FIG. 26, a probability estimation table 220 stores, for each state number ST, a probability interval (LSZ) of a less probable symbol LPS and transition information of the state number ST. The contents of the probability estimation table 220 are as shown in FIG. 3.

The arithmetic encoder 222 arithmetically encodes symbols in accordance with the output signal "Prediction Error" of the prediction conversion unit 208, the state number ST and the more probable symbol MPS, read from the state number/MPS memory 206, and the probability interval LSZ of the less probable symbol LPS and the transition state information read from the probability estimation table 220.

Figure 27:
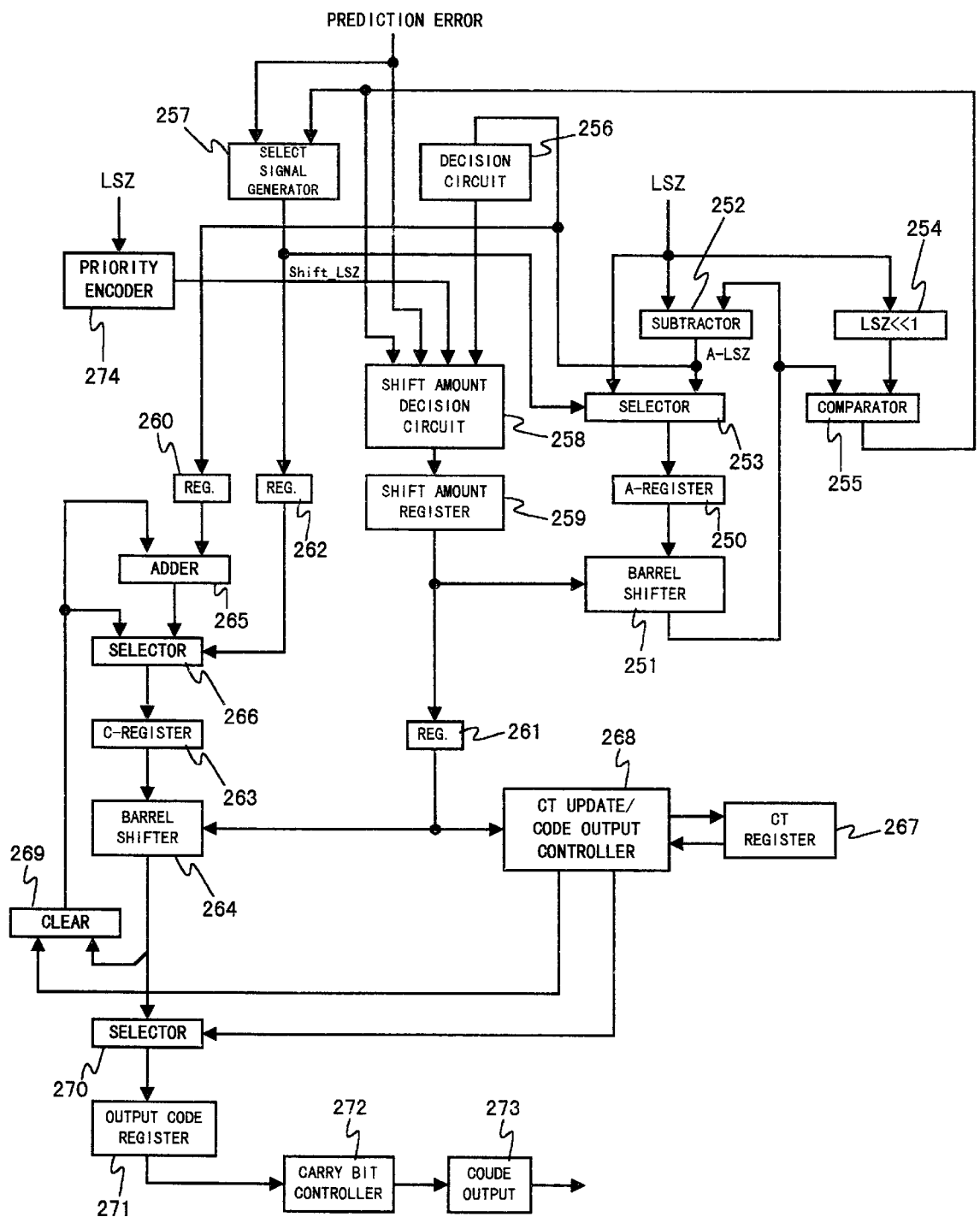
FIG. 27 is a block diagram showing the structure of an arithmetic encoder used in the encoding apparatus, shown in FIG. 26.
Figure 28:
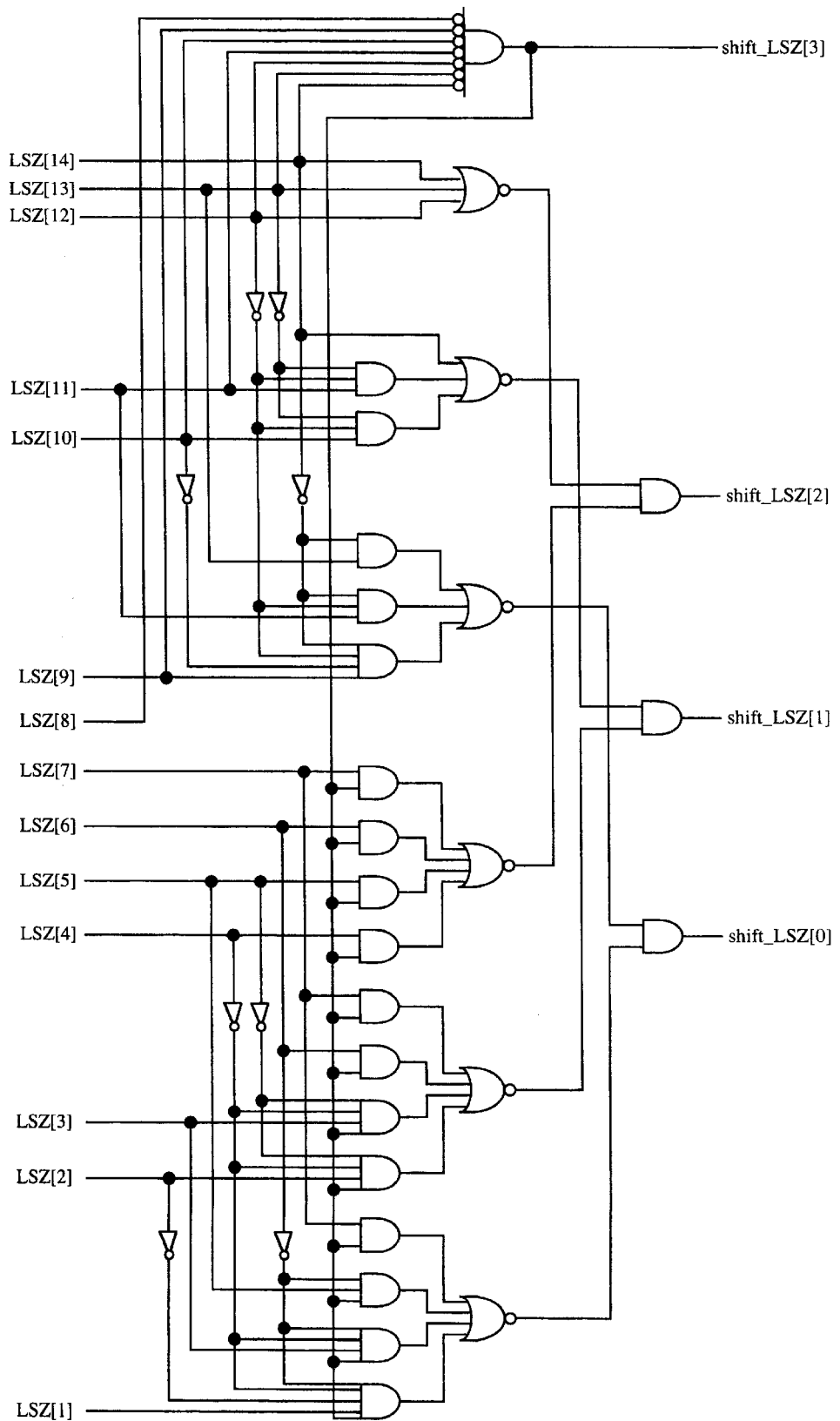
FIG. 28 is a logical operation circuit showing the structure of a priority encoder used in the arithmetic encoder, shown in FIG. 27.

FIG. 27 shows the structure of an encoder contained in the arithmetic encoder 222. In FIG. 27, a priority encoder 274 calculates a shift amount (potential shift-amount) "Shift_LSZ" in accordance with the output LSZ of the probability estimation table 220. FIG. 28 shows the structure of the priority encoder 274. FIG. 29 is a truth value table showing the relation between the input LSZ and output Shift_LSZ of the priority encoder 274. In FIG. 29, "x" represents zero or one in values of LSZ. It can be understood from FIGS. 28 and 29, the priority encoder 274 detects the position of "1" located at the leftmost side and generates a signal Shift_LSZ of four bits based on the detected position of value "1."

The shift-amount decision circuit 258 decides the shift amount of the A-register 250, on the basis of the prediction error signal from the prediction conversion unit 208, the $15^{th}$ bit of the output of the subtractor 252, the output of the decision circuit 256, and of the comparison result of the comparator 255. In the output of the subtractor 252, the $16^{th}$ bit is MSB (Most Significant Bit). The shift-amount decision circuit 258 outputs a shift amount of zero, when the current symbol is identical to its MPS and A-LSZ≧0×8000. When the current symbol is identical to its MPS and A-LSZ<0×8000, the shift-amount decision circuit 258 outputs a shift amount of one. On the other hand, if the current symbol is not identical to its MPS and A-LSZ<LSZ (Path 2 in FIG. 7) and the $15^{th}$ bit of the subtracter 252 holds one, the shift-amount decision circuit 258 outputs a shift amount of one. When the current symbol is not identical to its MPS and A-LSZ<LSZ (Path 2 in FIG. 7) and the $15^{th}$ bit of the subtractor 252 holds zero, the shift-amount decision circuit 258 outputs a shift amount of two. When the current symbol is not identical to its MPS and A-LSZ≧LSZ (Path 1 in FIG. 7), the shift-amount decision circuit 258 outputs a value Shift_LSZ, supplied from the priority encoder 274.

According to the above-described third preferred embodiment, the barrel shift operation is performed in one clock without monitoring the data in the A-register 250. That is, a shift amount to be assigned when LSZ is selected for the A-register 250 has been calculated by the priority encoder 274 in advance. When the operation runs through Path 1 in FIG. 7, the barrel shift amount "Shift_LSZ," calculated by the priority encoder 274, is selected. The selected shift amount is stored in the shift amount register 259.

Fourth Preferred Embodiment

Figure 30:
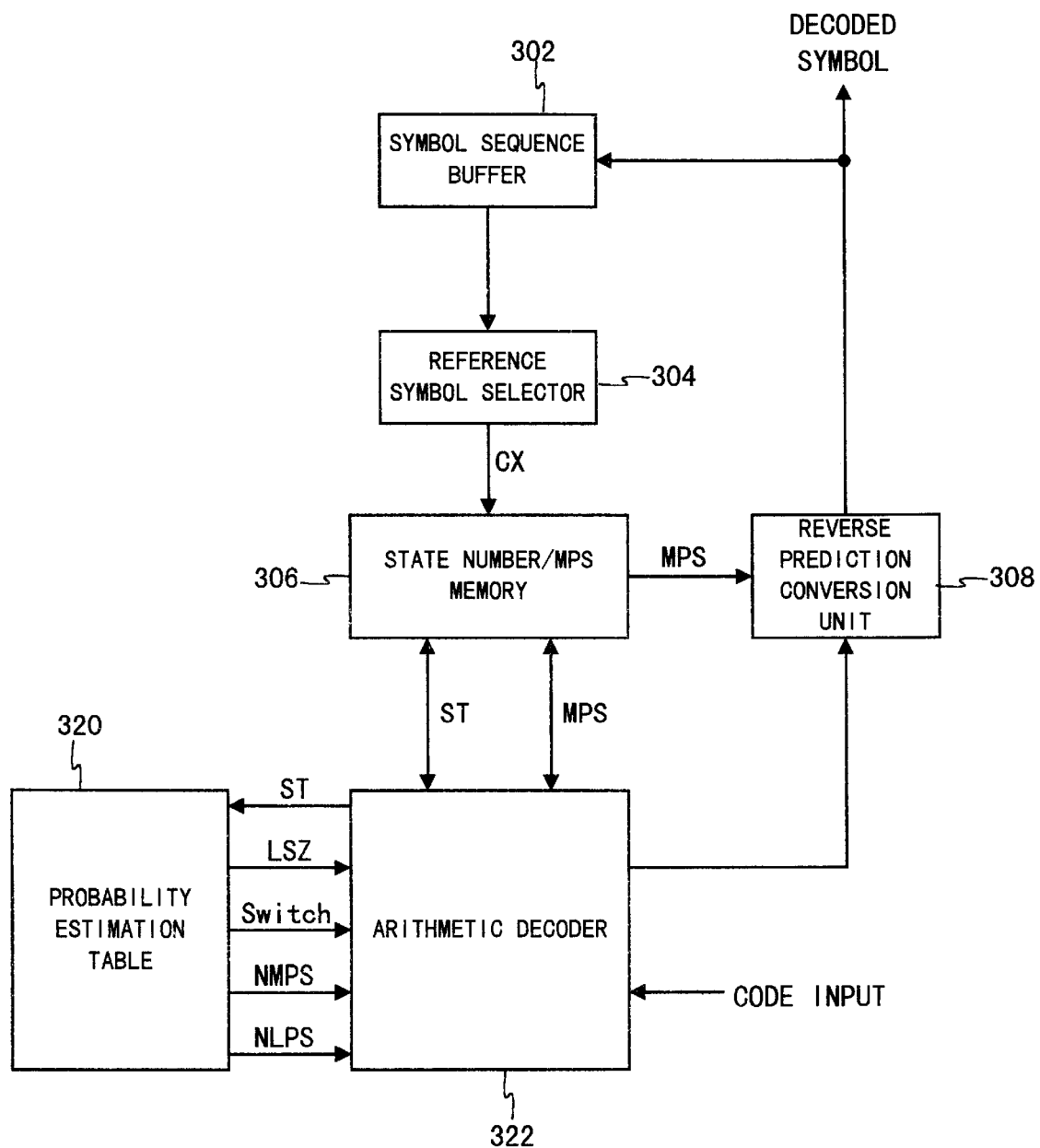
FIG. 30 is a block diagram showing a decoding apparatus, according to a fourth preferred embodiment of the invention.

FIG. 30 shows the structure of a binary arithmetic decoding apparatus, according to a fourth preferred embodiment of the invention. The decoding apparatus decodes the code data transmitted from the encoding apparatus shown in FIG. 26. The decoding apparatus includes many elements which are the same as those in the second and third preferred embodiments, and the same or corresponding elements are symbolized with the same reference numbers. In FIG. 30, a probability estimation table 320 is designed to be the same as the probability estimation table 220, shown in FIG. 26. The reverse prediction conversion unit 308 reproduce the original binary symbol sequence in accordance with the more probable symbol MPS, supplied from the state number/MPS memory 306, and with the symbol to be decoded, supplied from an arithmetic decoder 312.

The arithmetic decoder 322 finds whether the current symbol was MPS or LPS, in accordance with the information of the encoded data, state number and MPS value read from the state number/MPS memory 306, and the probability interval of the less probable symbol LPS and the transition state information read from the probability estimation table 320. The arithmetic decoder 322 performs the state transition process to update the state number/MPS memory 306.

For starting binary arithmetic decoding operation, the arithmetic decoder 322 reads a state number ST for the current context from the state number/MPS memory 306. The arithmetic decoder 322 reads a probability interval LSZ, corresponding to the state number ST, from the probability estimation table 320. The arithmetic decoder 322 subtracts the probability interval LSZ from the interval register. After that, the decoding process is performed in the same manner as the encoding process above described In response to a context supplied from the reference symbol selector 304, the arithmetic decoder 322 reads the more probable symbol MPS for the context, from the state number/MPS memory 306. The more probable symbol MPS is supplied to the reverse prediction conversion unlit 308. The reverse prediction conversion unit 308 compares MPS/LPS information, indicating whether the current symbol is the more probable symbol MPS or less probable symbol LPS, to the more probable symbol MPS value supplied from the state number/MPS memory 306 to reproduce the original symbol.

According to the fourth preferred embodiment, it is clear that the same advantages as the third preferred embodiment are provided. The encoding apparatus of the third embodiment and the decoding apparatus of the fourth embodiment may be combined to provide an apparatus including both encoding function and decoding function, such as a facsimile machine.

Although the invention has been described with respect to the specific embodiments for complete and clear disclosure, the appended claims are not be thus limited but are to be construed as embodying all modification and alternative constructions that may occur to one skilled in the art which fairly fall within the basic teaching herein set forth.

What is claimed is:

1. An apparatus for encoding an image data, using arithmetic encoding technique, in which a probability real-number line is divided on the basis of the condition of the image data to take the boundary point as an output code of the image data comprising:

an interval register which stores plural bits of interval data to be used for encoding data;

a calculator which updates the interval data in the interval register;

means for providing a potential shift-amount of the internal register for the image data in a specific condition wherein said potential shift-amount is independent of the output of said calculator;

a shift-amount decision circuit which generates an actual shift-amount of the interval register, in accordance with the potential shift-amount, and the output of the calculator;

shift-amount register which stores the actual shift-amount, supplied from the a shift-amount decision circuit; and a shifter which shifts the interval data in the interval register a plurality of bits simultaneously, in accordance with the actual shift-amount stored in the shift-amount register.

2. The apparatus, according to claim 1, wherein, the potential shift-amount providing means is a memory which stores the potential shift-amount of the interval register for the image data in the specific condition.

3. An apparatus for encoding an image data, using arithmetic encoding technique, in which a probability real-number line is divided on the basis of the condition of the image data to take the boundary point as an output code of the image data comprising:

an interval register which stores plural bits of interval data to be used for encoding data;

a prediction circuit which compares the image data to a predetermined prediction value thereof;

a first calculator which calculates, on the basis of the comparison result of the prediction circuit, a first interval on the probability real-number line to be assigned to the image data that is identical to its prediction value;

a first comparator which compares the first interval to a predetermined threshold voltage;

a second comparator which compares the first interval to a second interval assigned to an image data that is not identical to its predetermined value;

a memory which stores a potential shift-amount of the interval register, which is used for the image data wherein said potential shift-amount is independent of the output of said first calculator, that is not identical to its prediction;

a shift-amount decision circuit which generates an actual shift-amount of the interval register, in accordance with the potential shift-amount and the outputs of the decision circuit, the first calculator, the first comparator and the second comparator;

a first shift-amount register which stores the actual shift-amount, supplied from the a shift-amount decision circuit; and a shifter which shifts the interval data in the interval register a plurality of bits simultaneously, in accordance with the actual shift-amount stored in the shift-amount register.

4. The apparatus, according to claim 3, wherein, the output of the first shifter is supplied to the first calculator.

5. The apparatus, according to claim 3, further comprising:

a code register which stores a data indicating the boundary point on the probability real-number line;

a calculation-result register which stores the output of the first calculator;

a second calculator which calculates an update value of the code register on the basis of the output of the calculation-result register;

a second shift-amount register which stores the actual shift-amount supplied to the first shifter; and a second shifter which shifts the data in the code register a plurality of bits at one time, in accordance with the actual shift-amount stored in the second shift-amount register, wherein, the output of the code register becomes the code output of the image data.

6. The apparatus, according to claim 5, further comprising:

a converter which performs a predetermined conversion process to a part of the code output when the code output is made, wherein, the output of the converter is supplied to the second calculator.

7. The apparatus, according to claim 3, wherein, the second comparator comprises a shift operation circuit which shifts the second interval on the probability real-number line one bit to double the second interval; and a comparing circuit which compares the output of the shift operation circuit to the interval data from the first shifter.

8. An apparatus for decoding a code data, which is generated in accordance with arithmetic encoding technique, in which a probability real-number line is divided on the basis of the condition of the image data to take the boundary point as an output code of the image data comprising:

an interval register which stores plural bits of interval data to be used for decoding data;

a calculator which updates the interval data in the interval register;

means for providing a potential shift-amount of the internal register for the image data in a specific condition wherein said potential shift-amount is independent of the output of said calculator;

a shift-amount decision circuit which generates an actual shift-amount of the interval register, in accordance with the potential shift-amount, and the output of the calculator;

shift-amount register which stores the actual shift-amount, supplied from the a shift-amount decision circuit; and a shifter which shifts the interval data in the interval register a plurality of bits simultaneously, in accordance with the actual shift-amount stored in the shift-amount register.

9. An apparatus for encoding/decoding an image data, comprising:

the encoding apparatus according to claim 2.

10. The apparatus, according to claim 1, wherein, the potential shift-amount providing means is another calculator which calculates in advance the potential shift-amount of the interval register for the image data in the specific condition.

11. An apparatus for encoding an image data, using arithmetic encoding technique, in which a probability real-number line is divided on the basis of the condition of the image data to take the boundary point as an output code of the image data comprising:

an interval register which stores plural bits of interval data to be used for encoding data;

a prediction circuit which compares the image data to a predetermined prediction value thereof;

a first calculator which calculates, on the basis of the comparison result of the prediction circuit, a first interval on the probability real-number line to be assigned to the image data that is identical to its prediction value;

a first comparator which compares the first interval to a predetermined threshold value;

a second comparator which compares the first interval to a second interval assigned to an image data that is not identical to its predetermined value;

a second calculator which calculates a potential shift-amount of the interval register, which is used for the image data wherein said potential shift-amount is independent of the output of said first calculator, that is not identical to its prediction;

a shift-amount decision circuit which generates an actual shift-amount of the interval register, in accordance with the potential shift-amount and the outputs of the decision circuit, the first calculator, the first comparator and the second comparator;

a first shift-amount register which stores the actual shift-amount, supplied from the a shift-amount decision circuit; and a first shifter which shifts the interval data in the interval register a plurality of bits simultaneously, in accordance with the actual shift-amount stored in the shift-amount register.

12. The apparatus, according to claim 11, wherein, the output of the first shifter is supplied to the first calculator.

13. The apparatus, according to claim 11, further comprising:

a code register which stores a data indicating the boundary point on the probability real-number line;

a calculation-result register which stores the output of the first calculator;

a third calculator which calculates an update value of the code register on the basis of the output of the calculation-result register;

a second shift-amount register which stores the actual shift-amount supplied to the first shifter; and a second shifter which shifts the data in the code register a plurality of bits at one time, in accordance with the actual shift-amount stored in the second shift-amount register, wherein, the output of the code register becomes the code output of the image data.

14. The apparatus, according to claim 13, further comprising:

a converter which performs a predetermined conversion process to a part of the code output when the code output is made, wherein, the output of the converter is supplied to the third calculator.

15. The apparatus, according to claim 11, wherein, the second comparator comprises a shift operation circuit which shifts the second interval on the probability real-number line one bit to double the second interval; and a comparing circuit which compares the output of the shift operation circuit to the interval data from the first shifter.

16. An apparatus for decoding a code data, which is generated in accordance with arithmetic encoding technique, in which a probability real-number line is divided on the basis of the condition of the image data to take the boundary point as an output code of the image data comprising:

an interval register which stores plural bits of interval data to be used for decoding data;

a first calculator which updates the interval data in the interval register;

a second calculator which calculates a potential shift-amount of the interval register for the image data that was in a specific condition wherein said potential shift-amount is independent of the output of said first calculator, that is not identical to its prediction;

a shift-amount decision circuit which generates an actual shift-amount of the interval register, in accordance with the potential shift-amount, and the output of the calculator;

shift-amount register which stores the actual shift-amount, supplied from the a shift-amount decision circuit; and a shifter which shifts the interval data in the interval register a plurality of bits simultaneously, in accordance with the actual shift-amount stored in the shift-amount register.

17. An apparatus for encoding/decoding an image data, comprising:

the encoding apparatus according to claim 10.

* * * * *